Aug. 6, 1963   L. J. BISHOP ETAL   3,099,966
ENTRANCE SWITCH MECHANISM FOR OVERHEAD CONVEYOR
Filed Nov. 21, 1960   13 Sheets-Sheet 1
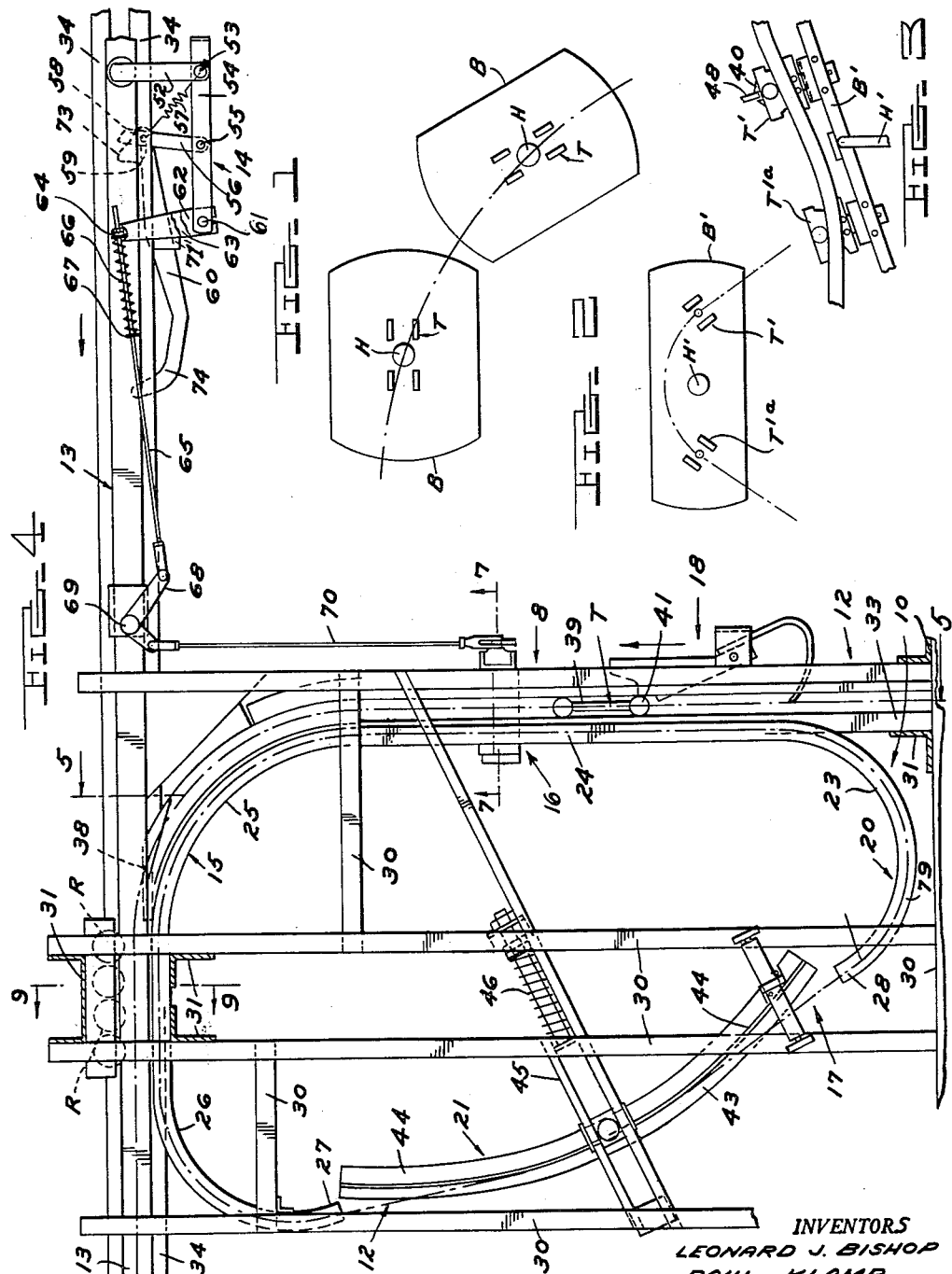
INVENTORS
LEONARD J. BISHOP
BY PAUL KLAMP
ROBERT KRAMMER
ATTORNEYS Aug. 6, 1963  L. J. BISHOP ETAL  3,099,966
ENTRANCE SWITCH MECHANISM FOR OVERHEAD CONVEYOR
Filed Nov. 21, 1960  13 Sheets-Sheet 2
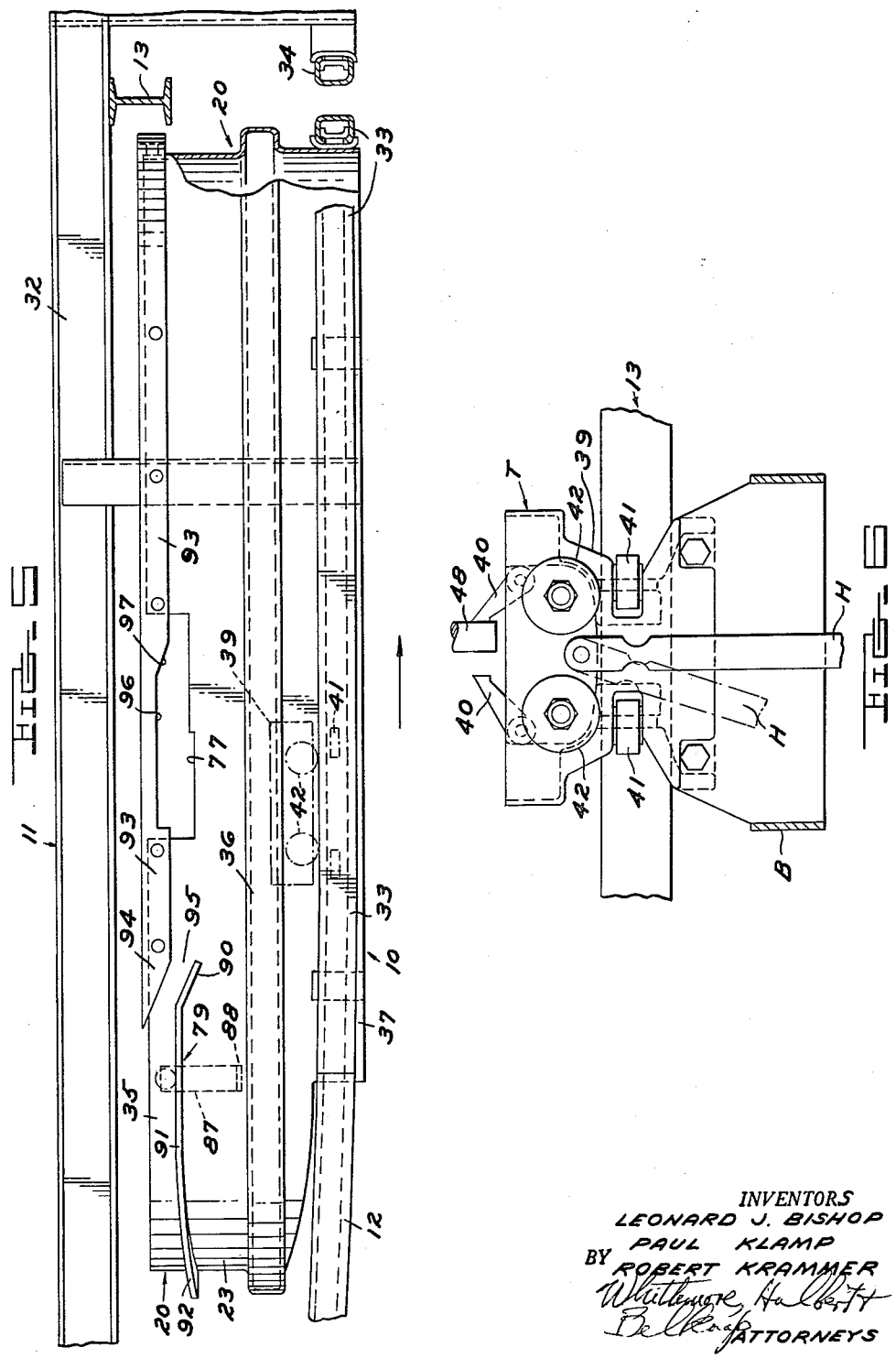
INVENTORS
LEONARD J. BISHOP
PAUL KLAMP
BY ROBERT KRAMMER
Whittemore, Hulbert
Belknap
ATTORNEYS

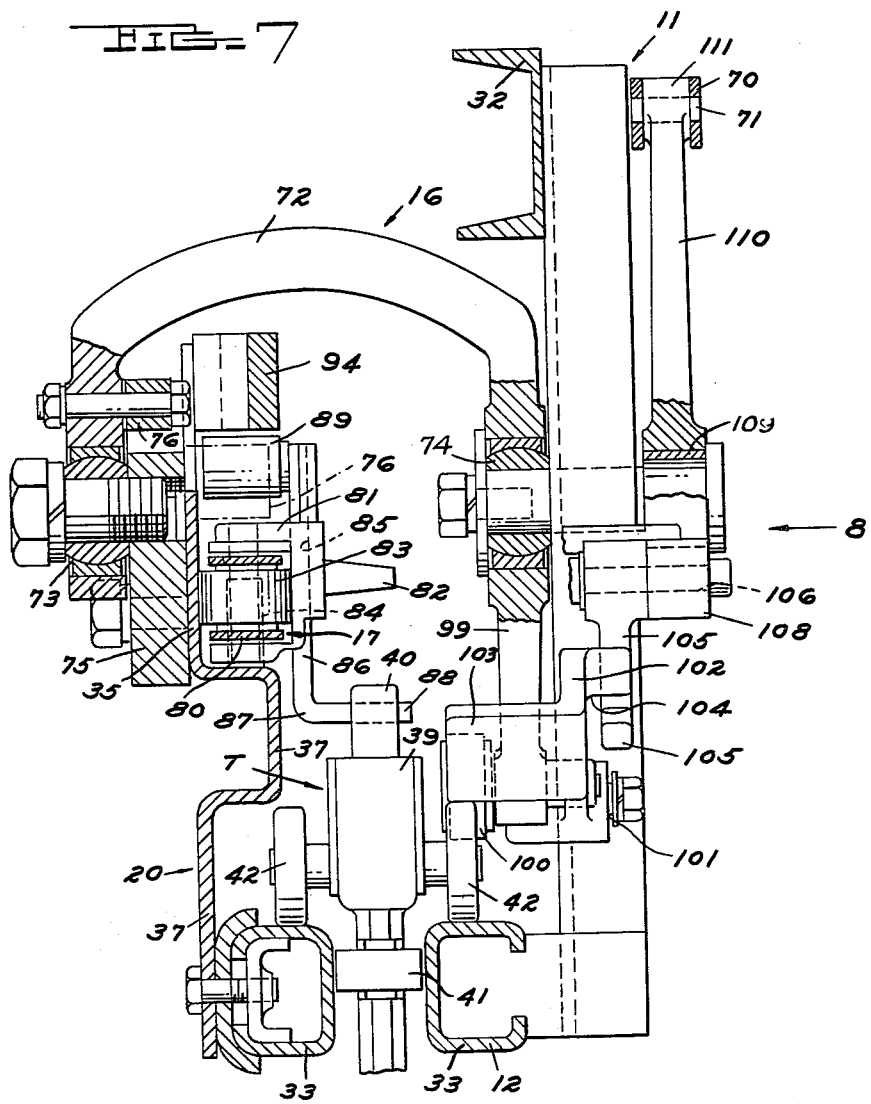

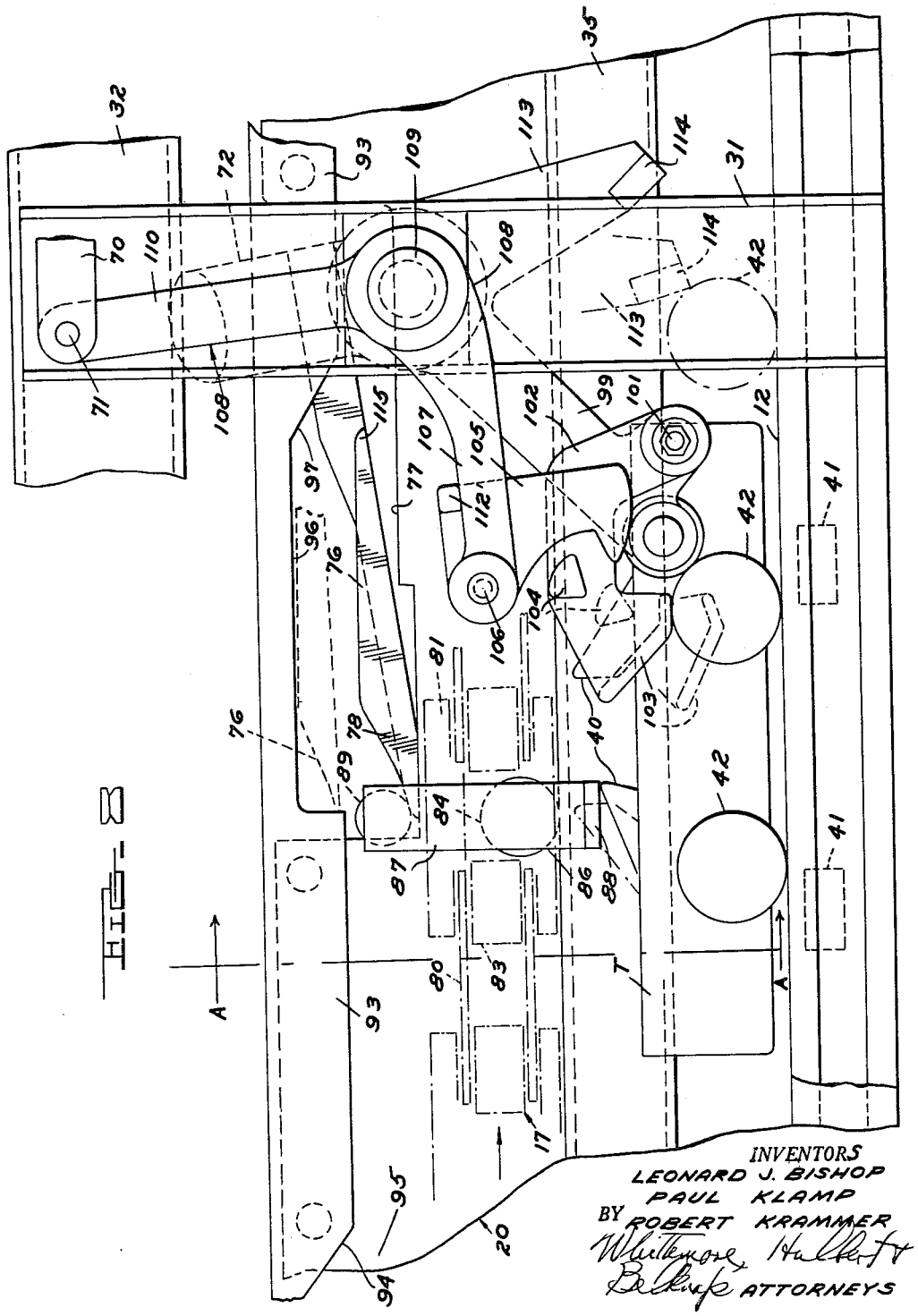

Aug. 6, 1963  L. J. BISHOP ETAL  3,099,966
ENTRANCE SWITCH MECHANISM FOR OVERHEAD CONVEYOR
Filed Nov. 21, 1960  13 Sheets-Sheet 5
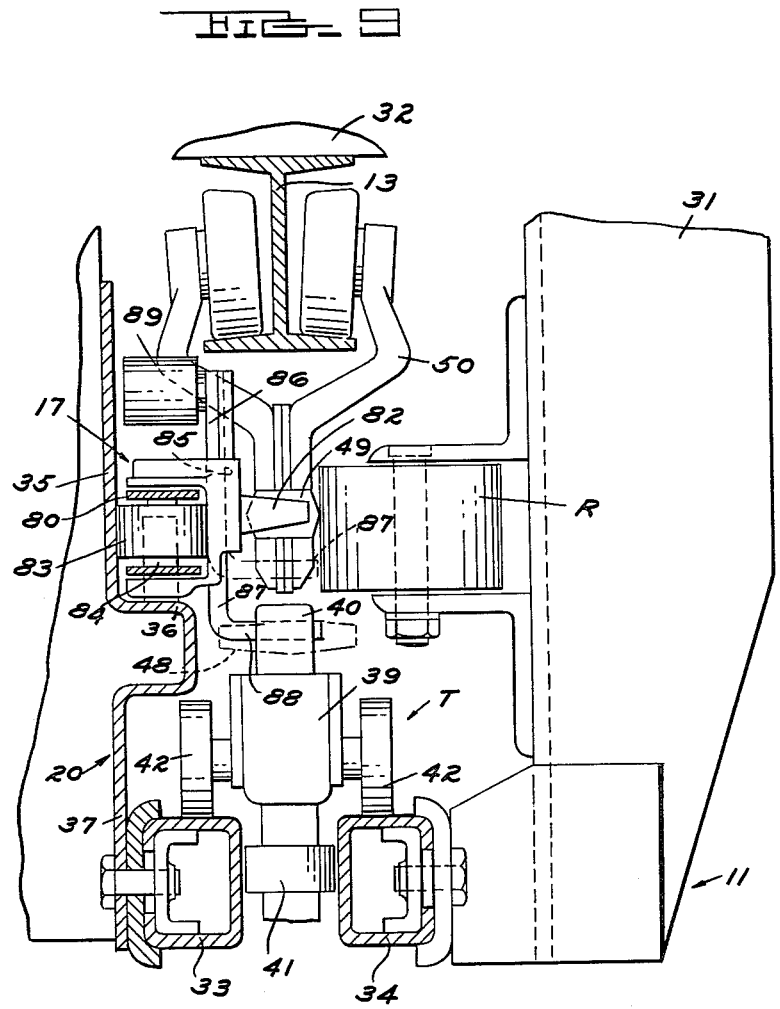
INVENTORS
LEONARD J. BISHOP
PAUL KLAMP
BY ROBERT KRAMMER
ATTORNEYS

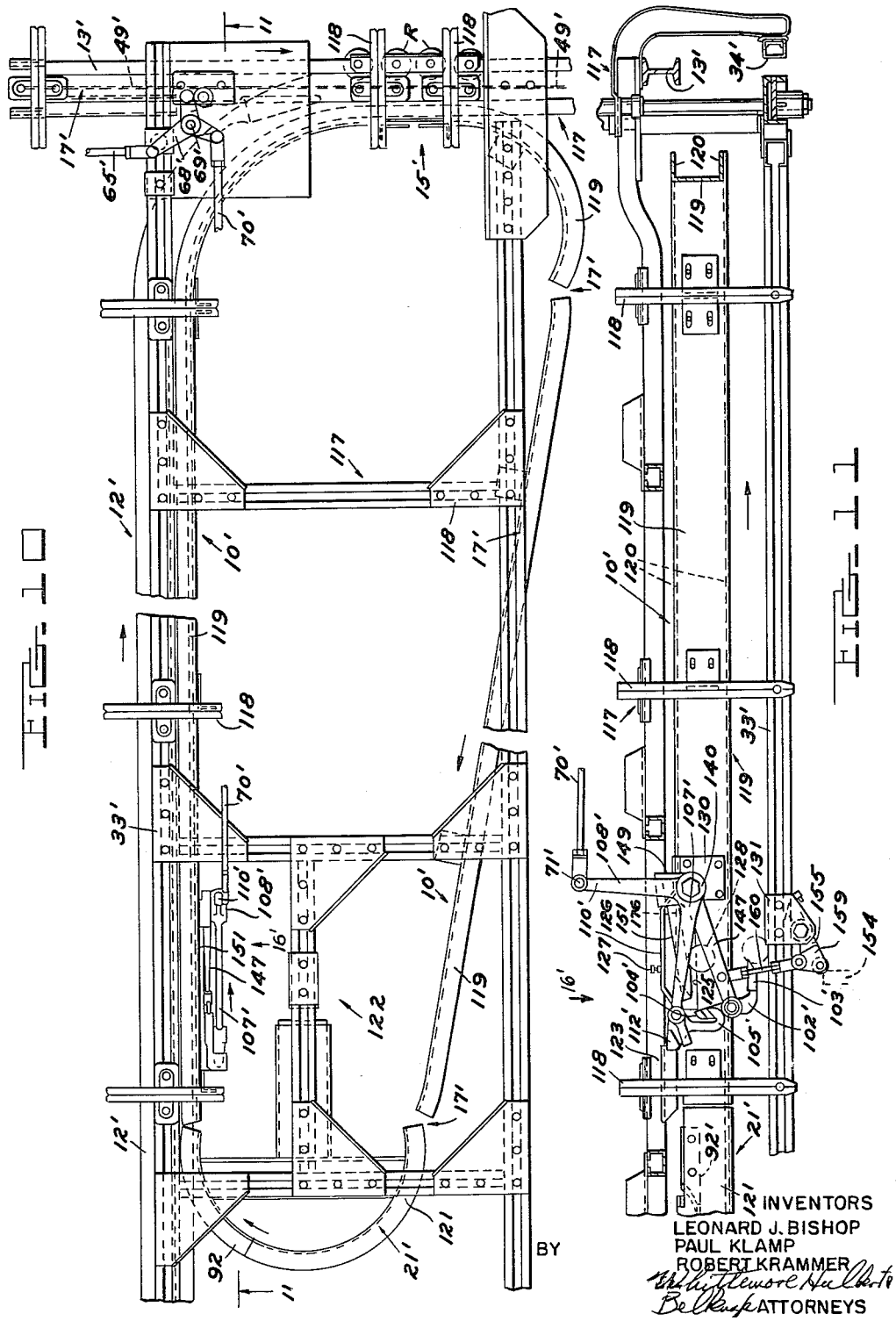

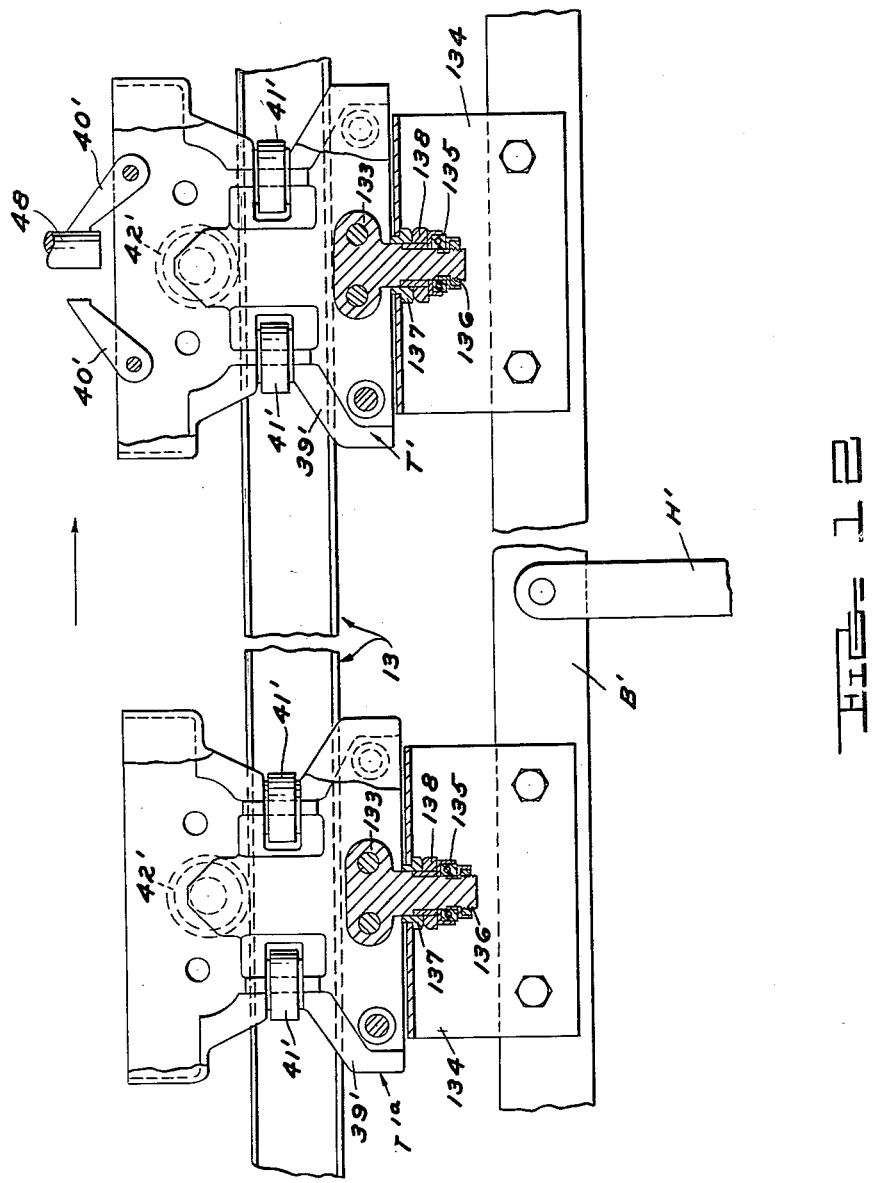

Aug. 6, 1963　　　L. J. BISHOP ETAL　　　3,099,966
ENTRANCE SWITCH MECHANISM FOR OVERHEAD CONVEYOR
Filed Nov. 21, 1960　　　　　　　　　　　　13 Sheets-Sheet 8
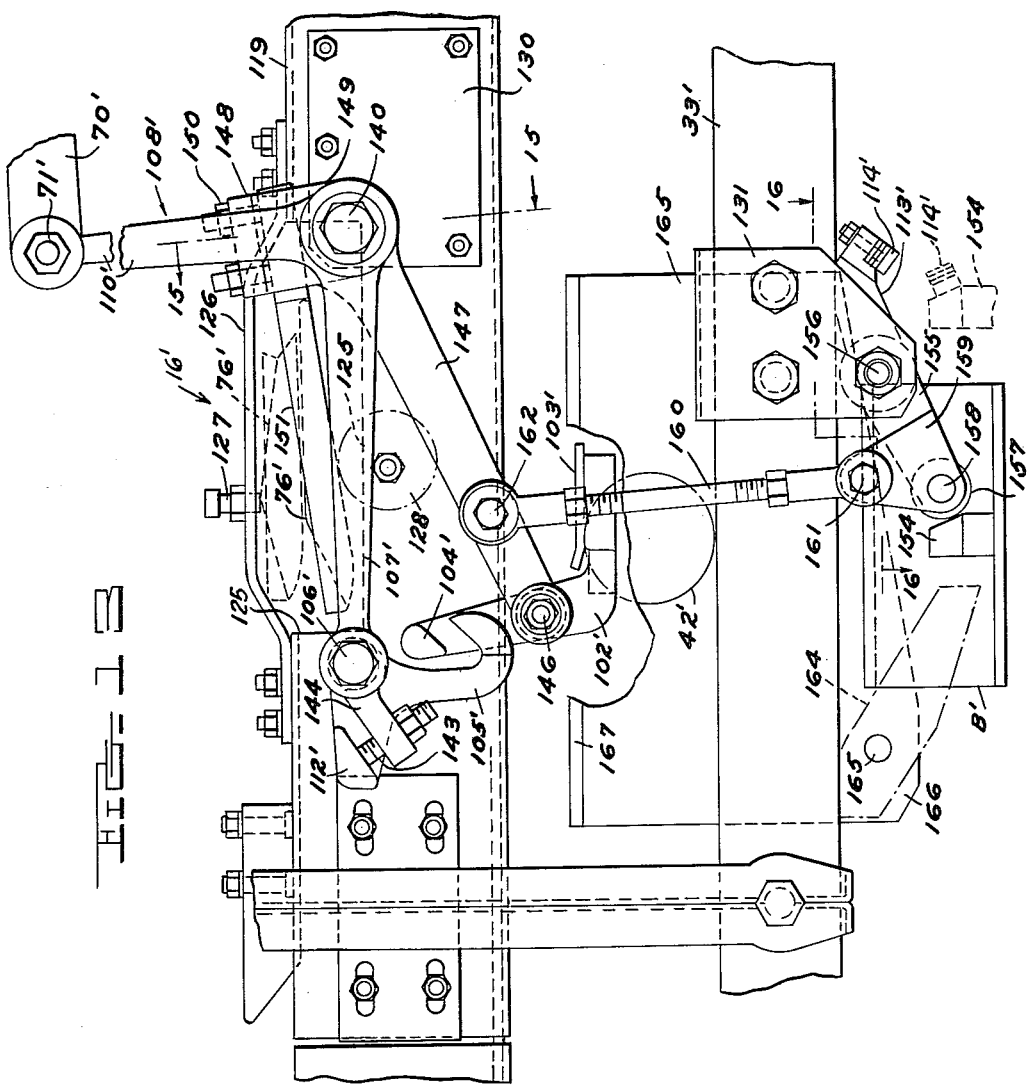
INVENTOR.
LEONARD J. BISHOP
PAUL KLAMP
BY ROBERT KRAMMER
ATTORNEYS Aug. 6, 1963    L. J. BISHOP ETAL    3,099,966
ENTRANCE SWITCH MECHANISM FOR OVERHEAD CONVEYOR
Filed Nov. 21, 1960    13 Sheets-Sheet 9

INVENTORS
LEONARD J. BISHOP
PAUL KLAMP
BY ROBERT KRAMMER

ATTORNEYS

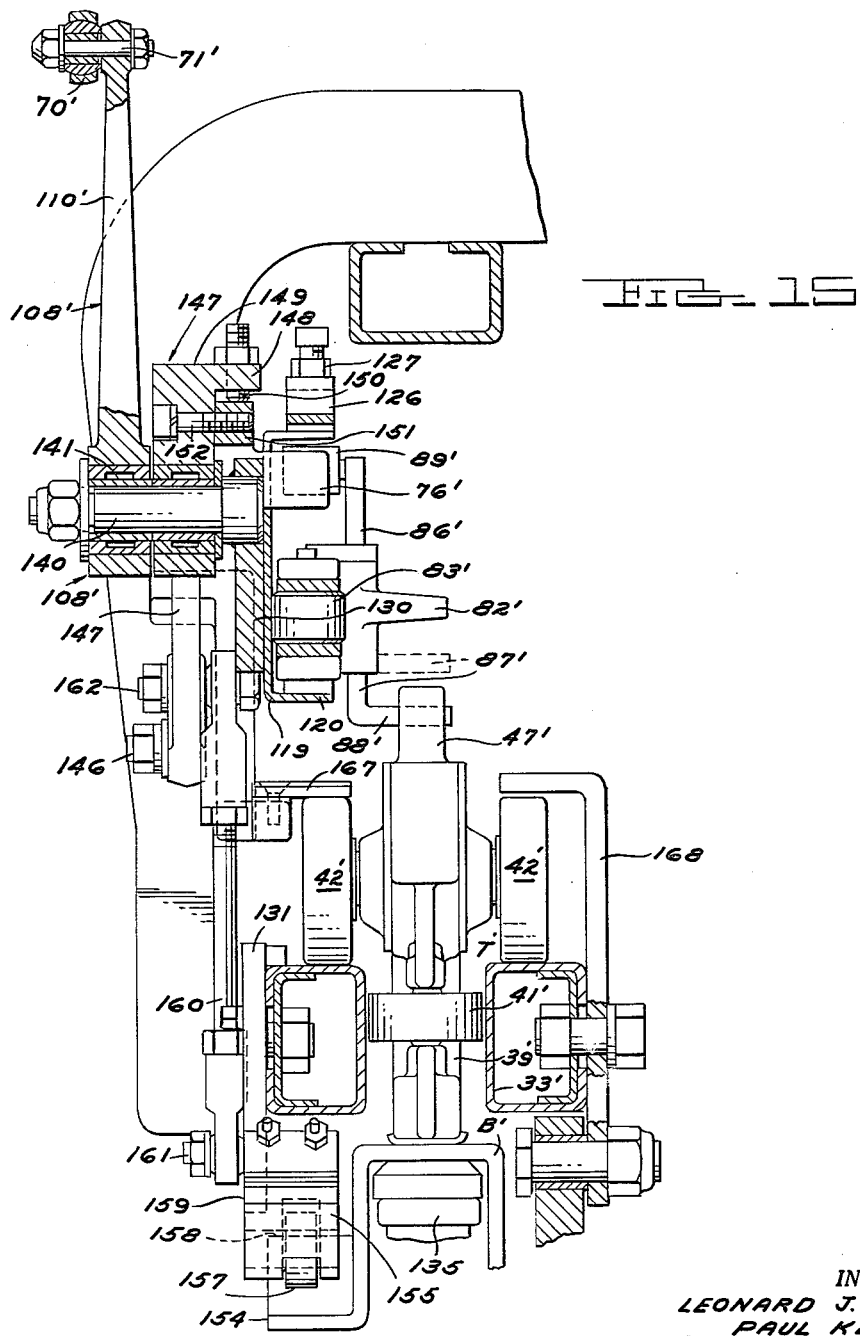

Aug. 6, 1963 L. J. BISHOP ETAL 3,099,966
ENTRANCE SWITCH MECHANISM FOR OVERHEAD CONVEYOR
Filed Nov. 21, 1960 13 Sheets-Sheet 11
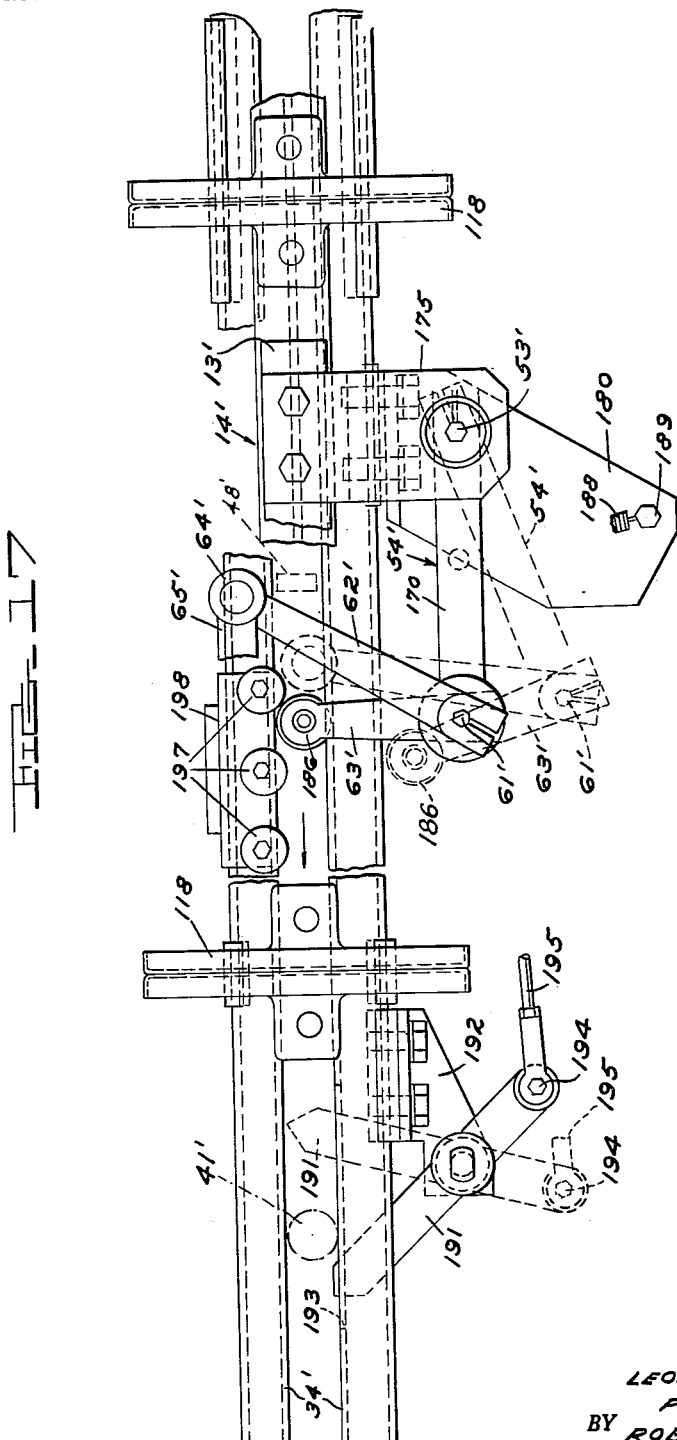
*INVENTORS*
*LEONARD J. BISHOP*
*PAUL KLAMP*
BY *ROBERT KRAMMER*
*ATTORNEYS*

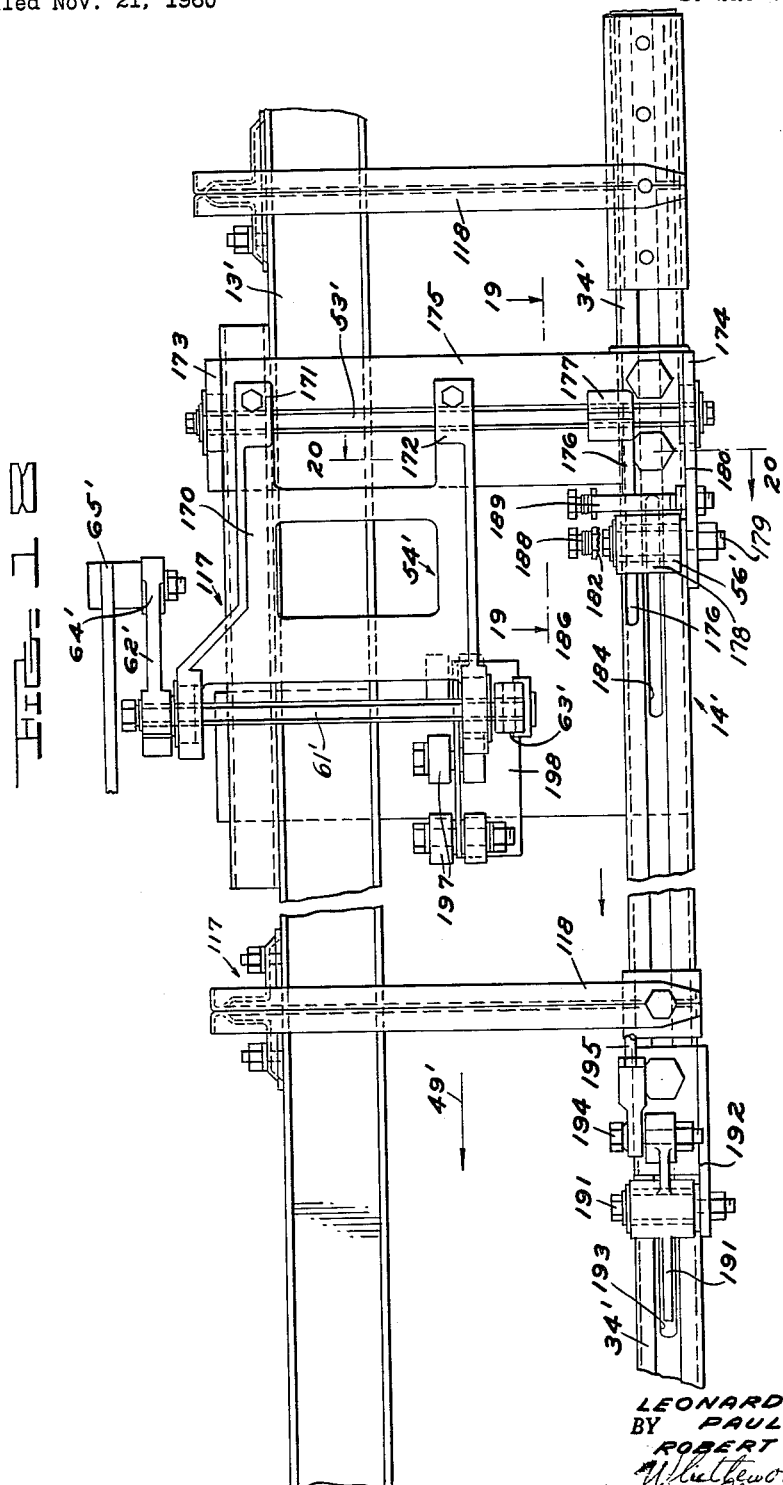

Aug. 6, 1963 L. J. BISHOP ETAL 3,099,966
ENTRANCE SWITCH MECHANISM FOR OVERHEAD CONVEYOR
Filed Nov. 21, 1960 13 Sheets-Sheet 13
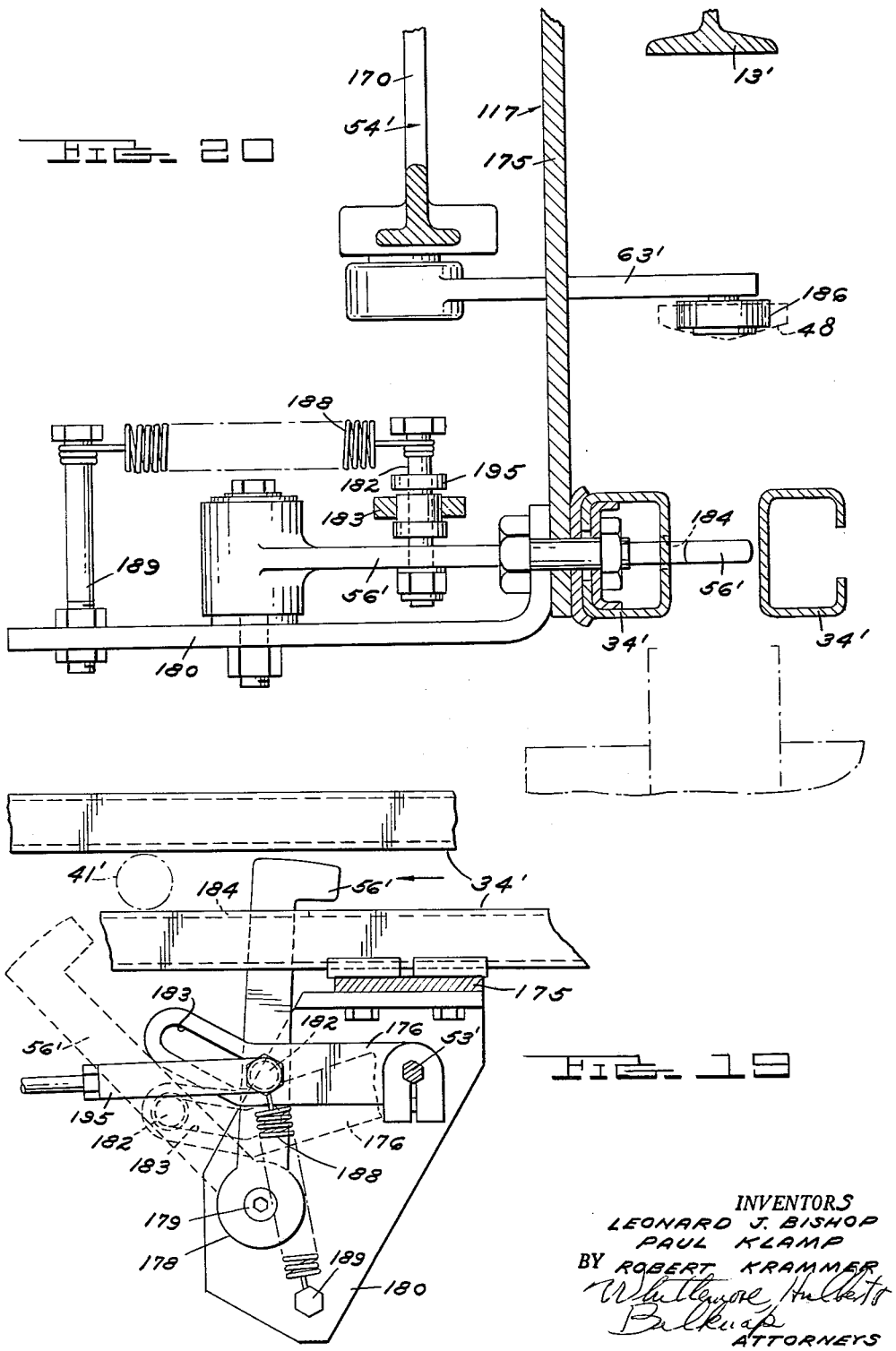
INVENTORS
LEONARD J. BISHOP
PAUL KLAMP
BY ROBERT KRAMMER
ATTORNEYS United States Patent Office 3,099,966
Patented Aug. 6, 1963

3,099,966
ENTRANCE SWITCH MECHANISM FOR OVERHEAD CONVEYOR
Leonard J. Bishop, Birmingham, Paul Klamp, St. Clair Shores, and Robert Krammer, Detroit, Mich., assignors to Mechanical Handling Systems, Inc., Detroit, Mich., a corporation of Michigan
Filed Nov. 21, 1960, Ser. No. 70,808
24 Claims. (Cl. 104—96)

The present invention relates to an improved entrance switch mechanism for an industrial conveyor, herein illustrated as being of the overhead, power and free type. The mechanism affords an accurately timed re-entry of load carrying trolleys from a free or branch line into a main power conveyor line, on which power chain dogs engage the trolleys and continue their advance. The present application is a continuation-in-part of a copending application of the same inventors, Serial No. 777,385, filed December 1, 1958, now Letters Patent No. 2,982,227 of May 2, 1961.

The mechanism of the present application features improvements over the entrance switch of the power and free conveyor system of Letters Patent No. 2,875,703 of March 3, 1959, to Leonard J. Bishop and Joel H. Barlow in that it is effective in a positive way to place relatively lightly loaded trolleys on a free or branch track in a predetermined position for accurately timed forwarding to the main power track, there to be picked up by power conveyor dogs and advanced as described.

It has been found that such lightly loaded trolleys, including the trolley and its supported load or load member, usually represented by a bumper assembly, are often of insufficient weight to move or trip a control mechanism governing the release of the trolley for re-entry from the branch track to the main power track, and therefore in accordance with the present invention there is provided a control mechanism in the form of a trolley stop and release device into which the trolley is positively propelled, regardless of its weight, in a way to insure reliable operation of the control mechanism regardless of the weight factor. In accordance with this objective, a positively driven transfer chain powers the trolley to a position in which the latter is stopped by such device, a halted trolley is released from driving engagement by the transfer chain, and is then positively advanced after a pause into the transfer zone of convergence of the branch track with the main track.

In the operation of the present improvement the stop and release action takes place under the control of dual means which are responsive respectively to engagement with the trolley and to engagement with a bumper or like load carrier supported by the trolley, more specifically, a master abutment block mounted on the carrier in predetermined positional relation to the carrier and to the trolley.

Two situations present themselves in two different types of installation of the system of the invention as broadly considered and as shown and described in our Patent No. 2,982,227 mentioned above. One is an installation in which relatively un-elongated loads, or light weight loads, are transported, being capable of being suspended from a single central point, and thus capable of following the motion of a single suspending trolley about track bends of considerable arcuate extent. Another installation will handle more elongated or heavier loads, for which the assistance of two longitudinally spaced suspending trolleys is required. This introduces a new problem in regard to the control of the trolleys and loads, load members or carriers at stop-and-release and empty place spotter stations of the installation, as will appear. The present application therefore presents two embodiments to satisfy the requirements of the two situations which may be encountered.

It is a general object of the invention to provide an entrance switch mechanism which features an entry transfer chain or like conveyor positively driven in accurate synchronism with a main power chain, which mechanism, in accordance with either of the embodiments thereof herein illustrated and described, provides an improved control including an improved trolley stop and release device in association with the branch or free track, which control involves means engageable with both a trolley and a load carrier supported thereby. It is in the zone of operation of this device that the free trolleys are first picked up and postively advanced by the transfer chain to a stop zone, and are there held for subsequent, accurately timed forwarding to the main track. However, improved provision is made to insure that such forwarding occurs only if a main power conveyor dog approaching the re-entry zone is free from driving engagement with a load bearing trolley on the main track, so that jamming of load bearing trolleys converging at the re-entry zone can never take place.

It is by reason of the accurately timed drive of the transfer conveyor chain relative to the main power chain that the unfailingly accurate feed of a trolley from the branch track onto the main power track is assured. The trolley propelling dogs or like members of the branch track always have an exact positional relation to those of the main track conveyor, not only longitudinally but also in reference to horizontal and vertical planes through the transfer zone. This in turn enables the spacing of the respective dogs on their respective conveyor chains to be made quite close, as compared with existing power and free conveyor installations, with resultant maximum speed and capacity as to load handling in an installation of a given size. These features of exactly timed travel of the conveyor dogs through the transfer zone, under the exact control afforded by the improved stop and release device, and under accurately synchronized operation of the two conveyors, are of great importance.

More specifically, it is an object to provide a control mechanism of this type, in which the trolley stop device includes means for disengaging the transfer conveyor chain from trolleys positively advanced by it into the stop zone by lifting a pusher dog of the transfer conveyor out of driving relation to the trolley. This occurs every time a pusher dog approaches the stop position, except when a trolley is waiting there and an approaching main line pusher dog is initiating a transfer signal. If the signal is a "transfer" one, such as to indicate that the advancing main conveyor dog is not pushing a loaded trolley, then the next following pusher dog of the transfer conveyor will remain held down and pick up the waiting trolley at the stop zone. Otherwise the operation is repeated and said following pusher will also be lifted to miss the waiting trolley. This takes place in a generally similar manner, and by generally similar mechanism, in both of the two embodiments referred to above. The difference is that in the first form, to be described, the trolley is halted and the transfer conveyor pusher dog disengaged therefrom, by mechanism controlled wholly by the trolley itself; while in the second form with which the present invention deals more particularly, the disengagement of the pusher dog is controlled by the trolley, but the halting of the latter and its load in part involve a control action performed by the load member or carrier, rather than by the trolley.

A further object of the invention to the last named end is to provide an improved empty place spotter unit adjacent the main track and in advance of the re-entry zone, this device being operatively connected to the trolley stop and release device to forward to the latter the signal mentioned in the preceding paragraph. Upon receipt of such "transfer" signal the stop device operates to condition the re-entry transfer chain for action. This, as indicated, is accomplished by maintaining the next advancing pusher dog of the transfer chain in a lowered position to engage and forward a branch track trolley, previously halted at the stop zone, into position for driving engagement by the advancing, unoccupied main power conveyor dog. Here again, the empty place spotting action, and mechanism originating or failing to originate a signal to the stop and release device, are generally similar in the two embodiments to be described, although specifically differing due to differences in the nature of the loads, and trolley suspension provisions therefor, in the two embodiments. That is, in the case of a load carrier supported by dual trolleys, provision is made that the empty place spotter shall not be restored or reset for operation by a following trolley-load carrier assembly until the preceding assembly has effectively cleared the zone of operation of the empty place spotter.

In general, it is an object of the invention to provide for the control of a trolley-supported load carrier through the joint agency of means engaging a trolley itself and means engaging a master abutment or stop block mounted on and projecting from the load carrier in predetermined positional relation to both a part of the trolley and to the load carrier itself.

The foregoing as well as other objects will become more apparent as this description proceeds, especially when considered in connection with the accompanying drawings illustrating the invention, wherein:

FIG. 1 is a schematic top plan view showing an arrangement of load bumpers as employed in accordance with a first embodiment of the improved entrance switch, these bumpers being a type which are centrally suspended from a single load supporting trolley, usually a four wheeled design;

FIGS. 2 and 3 are, respectively, schematic top plan and side elevational views illustrating the manner in which a second, alternative and modified embodiment of the invention accommodates the movement of longer load bumpers having swiveled depending connections to two distinct overhead trolleys, usually of a two wheel type;

FIG. 4 is a top plan view showing the general layout of the overhead track structure of the entrance switch mechanism and its relationship to main power and free line tracks of a typical installation, in accordance with said first embodiment of the invention;

FIG. 5 is a view of the track structure in vertical elevation and partial section along line 5—5 of FIG. 4;

FIG. 6 is a fragmentary view in side elevation of a four-wheel type overhead trolley of the sort employed in the first embodiment, the load bumper (shown in vertical longitudinal section) being suspended directly between the pairs of trolley wheels and directly following their path in traversing track bends;

FIG. 7 is a view in enlarged vertical section along a line corresponding to line 7—7 of FIG. 4;

FIG. 8 is a fragmentary elevational view of the stop and release device of the system, as viewed in the direction of the arrow 8 of FIGS. 1 and 7;

Figure 14:
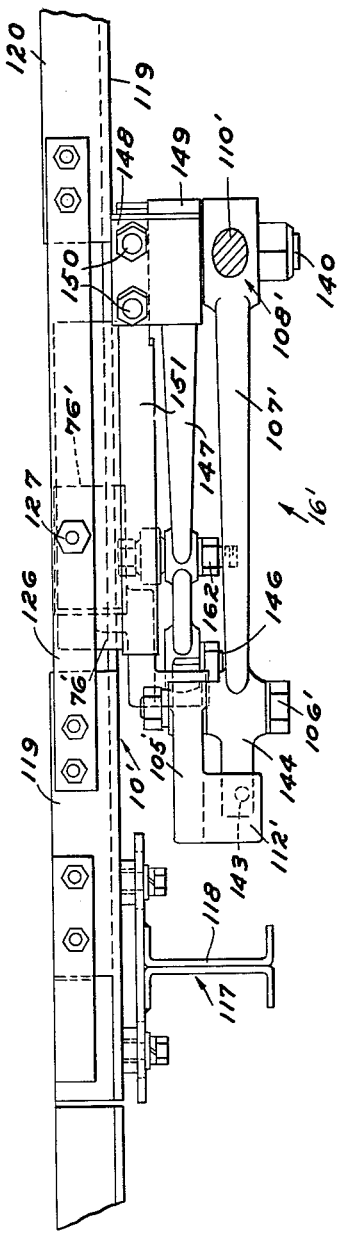
Figure 15:
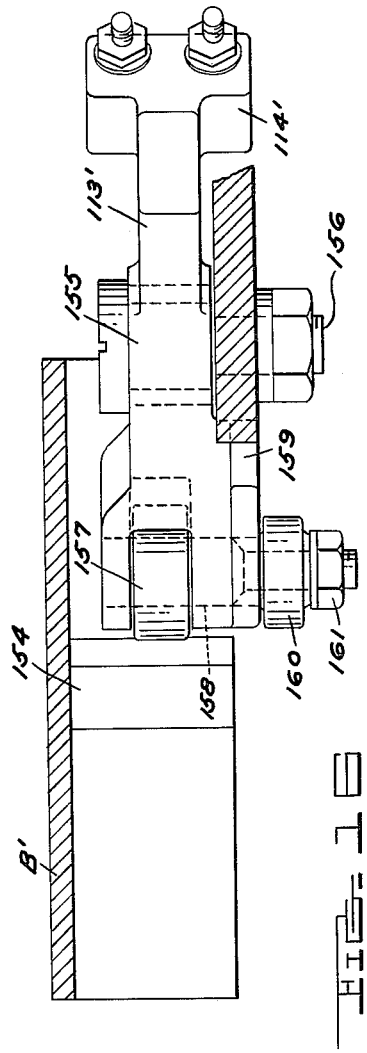

FIG. 9 is a view in vertical section approximately along the line 9—9 of FIG. 1, further illustrating structural details and relationships of the main power trolley, the load bearing trolleys, the transfer chain and track structure supporting and guiding these components, in accordance with the embodiment illustrated in FIGS. 1 and 4 through 8;

FIG. 10 is a top plan view, partially broken away, showing the general layout of a second and alternative embodiment of the entrance switch, in a typical installation in which dual-trolley load or bumper suspension is involved, in the manner shown in FIGS. 2 and 3, wherein it is necessary to at least in part control the stop and release mechanism of the system from a load member rather than a suspending trolley;

FIG. 11 is a view in vertical section along line 11—11 of FIG. 10;

FIG. 12 is a fragmentary view in vertical longitudinal section, generally similar to FIG. 6, illustrating the swiveled relationship of a load bumper to dual, longitudinally spaced overhead trolleys, in the manner indicated in FIGS. 2 and 3, for use with the alternative system of FIGS. 10 and 11;

FIG. 13 is a fragmentary elevational view, generally similar to FIG. 8, or as viewed from the arrow 13 of FIG. 10, of the modified stop and release mechanism in accordance with this alternative embodiment;

FIG. 14 is a fragmentary top plan view of the mechanism of FIG. 13;

FIG. 15 is a fragmentary view in vertical section along a line corresponding to line 15—15 of FIG. 13;

FIG. 16 is a view in horizontal section along broken line 16—16 of FIG. 13;

FIG. 17 is a top plan view, partially broken away, showing a portion of a modified empty place spotter incorporated in the second, alternative type switch of FIGS. 10 and 11;

FIG. 18 is a side elevational view, partially broken away, of the alternative empty place spotter;

FIG. 19 is a view in horizontal section, as from line 19—19 of FIG. 18, of a further portion of the empty place spotter not appearing in FIG. 17; and FIG. 20 is a view in transverse vertical section along line 20—20 of FIG. 18.

The two embodiments of the present invention in a conveyor entrance switch mechanism have their basic differentiation by reason of the different types of trolley suspension resorted to therein, in view of differences in length of the respective suspended load bumpers thereof, from which the respective actual loads are hung or otherwise supported, in one manner or another. FIG. 1 of the drawings schematically depicts one type of bumper and its suspension, while FIGS. 2 and 3 depict another type, involving the use of a considerably longer bumper and dual trolley suspension of the latter. These are hereinafter referred to as "single trolley load suspension" and "dual trolley load suspension," respectively.

FIG. 1 schematically shows an arrangement in which load supporting members, carriers or bumpers B are hung from above by the respective trolleys, generally designated T, propelled by an overhead power chain in a well known fashion. There is a single trolley for each bumper, usually of a type employing four load wheels or rollers arranged in pairs whose front-to-rear span is relatively slight, the horizontal center of the bumper B along which it is suspended being on a vertical line through the center of the trolley T. As will be described, the coupling of the bumper to the trolley is a rigid one (though the load may be pivotally suspended from the bumper), and the close spacing of the sets of trolley rollers enables the bumper to swing with the trolley as it rounds bends in the track along which the trolley T rolls. This close spacing of the forward and rearward trolley wheel pairs in turn permits the stop and release and empty place spotter control of the system by the arrangements of the first embodiment of the invention, illustrated in FIGS. 4 through 9. Control of both the stop and release mechanism at a free track, by which trolleys are forwarded in accurate timing to a main line track, is in response to actuation by the trolley itself, both in halting the same at the stop and release station and coupling or decoupling the same in reference to a transfer chain's pusher; as for the empty place spotter, this action is also responsive in part to a trolley having the close wheel spacing mentioned above, as described in the Patent No. 2,982,227 mentioned above. The tripping of the empty place spotter disables the stop and release mechanism from permitting a free track trolley to proceed to the transfer zone.

However, there are instances such as are shown in FIGS. 2 and 3, in which a longer load carrier or bumper B' is employed, such that in rounding a track bend it is necessary to employ two separate trolleys T', usually of a two wheel type suspending the bumper adjacent the front and rear zones of the latter. In such instances a horizontal swiveling connection of these respective trolleys to the bumper is employed, to the end that they may traverse the track bend successfully, notwithstanding the elongated span between the forward and rearward trolleys.

This, it will be seen, introduces a problem in the stop and release control and empty place spotter control actions of the system. Let it be assumed that the forward wheels of a dual trolley unit entering the empty place spotter zone will trip a part of the spotter mechanism, thus disabling the latter from sending a signal to the stop and release mechanism, which would result in operation of the latter to release a trolley halted thereat for propulsion by the transfer chain to the main line entry zone of the system. Normally, and in accordance with both embodiments of the invention herein shown, this tripping trolley next resets the empty place spotter to original position, and in the first, single trolley load suspension embodiment, there is no further action performed by the single trolley in question, since it has passed the zone of operation of the empty place spotter mechanism.

However, in the case of the second, dual trolley load suspension embodiment, it is seen that, by reason of the relatively longer spacing span of the front and rear trolleys T', it is necessary that the reset action performed as above described by its forward trolley be delayed until its rear trolley has passed the zone of operation of the empty place spotter mechanism, so that the load may fully pass such zone and be advanced by the main line power chain pusher dog through the zone of transfer trolley re-entry to the main line.

These differences in requirements as regards the single and dual trolley load suspension types have in accordance with the present invention been met by appropriate changes in the empty place spotter mechanisms of the second installation, and in effecting stop and release control, not through the agency of the trolley alone, as in the first form, but through the joint agencies of the trolley and its supported load or load bumper, in the second form, as will now be described.

*Single Trolley Load Suspension—in General*

The improved entrance switch of this embodiment is generally illustrated, in regard to the relationship of its major components, in FIG. 4 of the drawings. These include, in the order in which they will be discussed as sub-assemblies or component units, a transfer conveyor control and guide track structure, generally designated 10, which is supported by suitable overhead superstructure, generally designated 11, at the junction area of an overhead branch or free track 12 for load bearing trolleys and a main overhead power line or track 13; an empty place spotter unit or device 14 situated adjacent one side of the main, power trolley track 13, in advance of the re-entry transfer zone 15; a trolley stop and release unit or device 16 located to one side of an extension of branch track 12 which joins the transfer track structure 10 (this device being operatively coupled to and controlled, as will be described, conjointly by trolleys propelled into it and by the empty place spotter 14); the endless transfer conveyor itself, indicated in general in the plan view of FIG. 4 by the numeral 17 applied to the longitudinal center line of its endless chain; and a trolley anti-rebound or back stop device 18 in advance of the trolley stop and release device 16 on the same side of the track.

*Track Structure*

Referring to FIGS. 4, 5 and 7 for the general arrangement of the transfer conveyor control and track structure 10, it consists primarily of a fixed horizontal control and track section 20 of special outline to be described, along which the chain of transfer conveyor 17 is guided, and by which the action of its trolley engaging dogs is controlled, and a chain takeup and supplemental track device, designated 21.

As shown in FIG. 5, the track section 20 is preferably formed, in the main, as a one-piece stamping bent to the desired outline and cross-sectional configuration to afford all of the necessary transfer trolley supporting and chain dog control and guide track provisions. Referring again to FIG. 4, track portion 20 includes a curved reach 23 of somewhat less than 180° extent, along which the conveyor 17 is guided in converging to a parallel relationship with the branch track 12; a straight reach 24 extending along this zone; a quadrantal 90° reach 25 around which it comes into parallelism with the main power track or line 13 at the re-entry zone 15; and an arcuate reach 26 departing from zone 15 to guide conveyor 17 in its endless travel.

Track reach 26 terminates at 27 in substantially spaced relation to the nearest adjacent end 28 of the initial arcuate reach 23, and the space between these ends is occupied by the chain takeup and supplemental track device 21.

As shown in FIGS. 4 and 5, the superstructure 11 which supports the track 10 and takeup device 21 may comprise a suitable system of welded, horizontally disposed angle irons or channels, including transverse and longitudinal frame and bracing irons 30. All of these parts are ceiling-suspended appropriately, as by a system of hangers 31 of channel or equivalent section and horizontal beams 32 such as sustains the branch track 12 and main track 13. Preferably, the track section 20 will incorporate a trolley track member 33 (see FIG. 4) which is located in alignment with one of the track ways of the free or branch track 12, and is in effect a continuation of the latter.

As illustrated in FIG. 5 (considered in conjunction with FIGS. 7 and 9 in which further conveyor and trolley control mechanism is shown), the main power track 13 is a monorail type of the familiar I-beam section sustaining on its bottom flanges the track rollers of chain-driven power trolleys (hereinafter described). The free trolleys T ride the spaced parallel ways 34 of a main line trolley track.

As best shown in FIGS. 5 and 7, the track section 20 is preferably fabricated as a single plate-like stamping bent to provide an upright top web portion 35 (in which certain control aperturing is made along the longitudinal reach 24), an intermediate, inwardly bent and horizontal chain guiding track way 36, an an upright bottom web 37, to which the track member 33 may be bolted or welded as an extension of one of the ways of branch track 12.

The track member 33 is brought continuously around the arcuate reach 25 and into the re-entry zone 15 where, as shown in FIG. 4, it coacts with a transversely spaced way 34 of the main track 13 in sustaining the trolleys T.

A suitable track switch tongue or frog 38 (see FIG. 4) is pivoted at the junction of the transfer track reach 25 with main track 13 to support trolleys passing onto the main line.

The trolleys T of the first embodiment are of the four-wheel type, including (as shown in FIG. 6) a body 39 supporting pivotally mounted front and rear restraining and driving dogs 40 and vertically journalled guide rollers 41 (see also FIGS. 7 and 9) and rolling on pairs of forward and rearward load wheels or rollers 42. The provisions by which loads are supported from trolleys T are such that the line of suspension down to the load bumper B (as through a pivoted hanger H) is in this embodiment a vertical one between the respective pairs of forward and rearward load wheels or rollers 42.

The chain takeup and supplemental guide track device 21 does not constitute a material part of the invention of the present application, though illustrated, described and claimed in the above identified parent application of the present invention, to which reference may be made for details of its construction. It suffices to state that device 21 (see FIG. 4) comprises a horizontal arcuate track portion 43 carried on an arcuate upright plate 44 and mounted for guided motion in a laterally confined horizontal way 45 against the resistance of a coil compression spring 46. Thus the takeup device 21 exerts continuous tensioning action on the transfer chain 17 while the latter is supported and guided by the track portion 43, as schematically indicated in FIG. 4.

*Empty Place Spotter Unit*

This device as incorporated in the first embodiment is generally designated 14 and is illustrated in a general way in FIG. 4 of the drawings. Its function is to transmit a mechanical signal to the trolley stop and release device 16 of FIG. 4 (hereinafter described) only when a main power conveyor drive or pusher dog unoccupied by a load bearing trolley aproaches re-entry zone 15 along the main track of the installation. Such main line drive dog appears in dotted line in FIG. 9, being designated 48. Dogs 48 conventionally depend from links of a driven power chain 49 supported by trolleys 50 riding the flanges of the main line track 13. Chain 49 is conventionally driven by a mating caterpillar drive device (not shown).

Reference may be made to the parent application, Serial No. 777,385, now Patent No. 2,982,227, for full details of construction of the empty place spotter 14. As generally shown ni FIG. 4, it essentially comprises a yoke-like linkage pivotally mounted on and to one side of the main track 13. To this end, the I-beam 13 has a rigid arm 52 fixedly secured to the top flange of the beam to project laterally of the track. A vertically elongated rod 53 is carried in depending relation to the outer end of arm 52, extending downwardly to the side of one of the load trolley track members or ways 34 of the main track, and being similarly braced at its lower end in relation to that track member.

Vertical rod 53 serves as a pivotal support for a swinging yoke 54 of laterally disposed U-shaped outline; and the vertically spaced horizontal arms of the yoke 54 are suitably braced medially of the length thereof by a vertical rod 55. Rod 55 provides a vertical pivot for a swingable arm 56, which extends laterally inwardly through a slot in the adjacent load trolley track member 34 and well into the path of the vertically journaled guide rollers 41 on the trolleys T, which operate between the opposed vertical webs of the track members 34.

A coil spring 57 acts between a pin 58 on arm 56 and a fixed anchor on the fixed rod 53 to urge the arm 56 clockwise, as viewed in FIG. 4. The pin 58 is guided in a short horizontal slot 59 in an elongated secondary throwout and reset arm 60, to be described. Pin 58 normally engages a fixed latch element (not shown) on the adjacent track member 34, so that in the absence of a load bearing trolley T being propelled by a main line chain dog 48 along load track members 34 nothing happens; and the pivoted arm 56 retains its solid line position of FIG. 4. The remaining parts of the empty place spotter 14 then come into play, in a manner to be described, to forward the intended mechanical signal to the trolley stop and release device 16 which will enable a trolley waiting on the branch line to be forwarded to re-entry zone 15.

The outer ends of the yoke 54 are connected by a third vertically elongated rod 61 which serves as a pivot for a pair of vertically spaced operating arms 62 and 63. The lower arm 63 extends inwardly over the space between the load track members 34, at a sufficient elevation to clear trolleys T traveling therealong, but to be engaged and operated by a pusher dog 48 of the power chain 49 of the installation. The other and upper operating arm 62 is positioned above the main track 13, where it is coupled by a swiveled connection at 64 with an elongated thrust rod 65. The rod 65 is surrounded by a coil compression spring 66 which acts between the swiveled connection 64 and an abutment 67, relative to which connection rod 65 telescopingly slides, to urge the connection to the right, as viewed in FIG. 4.

Accordingly, as the lower arm 63 is engaged by an advancing power trolley dog 48 (unoccupied by a load bearing trolley T), the rod 65 is shifted longitudinally to the left and power is transmitted, through means to be described, to stop and release unit 16 to release a trolley. However, in the event the advancing power dog 48 is occupied by a load bearing trolley, the forward guide roll 41 of the latter will engage pivoted arm 56, swinging the latter counterclockwise as viewed in FIG. 4, and thereby disengaging its pin 58 from the fixed latch member (not shown), which previously restrained arm 56 from movement outwardly of track 34.

The further result is that the yoke linkage of unit 14 is swung counterclockwise by the trolley about the pivot rod 53 for yoke 54, as viewed in FIG. 4, thus positioning the operating arms 62, 63 in the corresponding position, in which the power chain dog 48 misses engagement with the latter arm 63 and no force transmitting motion of the thrust rod 65 takes place. The stop and release unit 16 remains in a condition to halt a trolley on the branch track, in a way to be described.

The end of the thrust rod 65 is pivoted to one arm of a bell crank 68 pivoted at 69 atop the track beam 13; and another and shorter arm of this bell crank has an elongated pull rod 70 pivoted thereto. The opposite end of pull rod 70 is pivotally connected at 71 (see FIGS. 4, 7 and 8) to the trolley stop and release device 16 to operate the latter, as will be described.

In order to reset the empty place spotter mechanism 14 to its solid line position of FIG. 4 for similar signaling (or not), the elongated throw-out and reset arm 60 referred to above is medially pivoted on a vertical axis by a fixed bracket 71' at one side of a load track member 34. One of its functions is to insure that the pin 58, as moved to the left by a trolley advanced by a main line pusher, will not hang up on the end of the fixed latch (not shown); and to this end the rear end 73 of this arm is curved in shape for camming engagement by the guide roll 41 of that trolley, after it has swung arm 56, as described. Thus arm 56 and yoke 54 are positively driven through the pin and slot connection 58, 59 to the dot-dash release or throw-out position of FIG. 4.

The other function of arm 60 is to restore the empty place spotter to its original position; and this is done when the forward trolley guide roller 41, having signaled at the spotter device 14, engages and outwardly moves a forward incurved extremity 74 of the reset arm 60. This extremity projects through a side slot in the track way 34 into the line of movement of the guide roller 41. The resultant counterclockwise motion of arm 60 is effective through its connection at slot 59 with the pin 58 on arm 56 to swing yoke 54 clockwise and re-engage pin 58 behind the fixed latch (not shown), the arm 56 being urged clockwise about its own pivot at 55 by spring 57.

*Trolley Stop and Release Device*

The device 16 is illustrated in FIGS. 7 and 8 of the drawings, and its function is to control the stopping and accurate positioning of each trolley T adjacent the transfer unit 10 of free or branch track 12, as the trolley is advanced by transfer chain 17 into a stop zone. As indicated above, the device 16 releases the trolley responsive to a signal forwarded by the empty place spotter 14, i.e., when an advancing power conveyor dog 48 is not occupied by a load bearing trolley. The presence of the positive-acting stop and release mechanism 16 is dictated by the fact that the installation may be handling relatively light loads whose impetus alone is not sufficient to operate another type of control mechanism. In such case it is desirable to advance the free track trolleys forcibly into the control zone, a function here performed by the transfer conveyor chain 17, under control by mechanism 16.

The mechanism 16 includes a swinging yoke member 72 which, as illustrated in FIG. 7, is of generally inverted U-shaped outline. It is mounted to swing in a vertical plane paralleling the branch or free track on bearings 73 and 74 which are, respectively, carried by a spacer 75 secured to the top web portion 35 of the one-piece track member or section 20, and to an upright member 31 of the supporting superstructure 11. One arm of the yoke 72, as shown in FIG. 8, fixedly carries a rearwardly projecting, plate-like control cam 76 on its inner side. Cam 76 is received in a recess 77 formed in the top of the upright web portion 35, and is extended in width at its rear portion 78, which normally rests on the top edge of the recess 77, to provide a tongue-like cam formation.

Referring to FIG. 5, a cam track 79 is welded on the outer surface of the track section 20, upon which cam track the pusher dog follower rollers of the transfer conveyor 17 (to be described) are adapted to roll.

It is now in order to refer briefly to FIGS. 7, 8 and 9 for structural features of the transfer conveyor 17 and its driven and pusher dogs. The conveyor 17 is an endless chain 80 having links 81, certain of which are of special character. Each of the links 81 is provided with an integral, laterally outwardly extending dog or lug 82, which engages a link of the main power chain 49 as the two chains travel side by side through the re-entry zone. There are always a number of dogs or lugs 82 in driven, caterpillar engagement with the chain 49 in this zone, for optimum transmission of power to the chain 80 of transfer conveyor 17, and its timing relative to the main line conveyor is positive and very accurate. This enables the very close spacing of conveyor trolley propelling dogs referred to above.

At the points of articulation of its links the chain 80 is equipped with vertically journalled anti-friction rollers 83, which bear laterally against the top web 35 of track section 20, as well as against the plate 44 of its tension take-up device 21 (see FIG. 4). Each of the special drive links 81 is further provided with a horizontally journaled anti-friction roller 84, which rides the top of the integral track way 36 of the track section 20.

The special drive lug carrying links 81 of chain 80 are additionally equipped, inwardly of their respective drive lugs 82, with integral, vertically extending guide ways 85, in each of which the upright shank or body portion 86 of a special drive dog 87 is slidably received. These dogs have laterally out-turned driving feet 88 which, as best shown in FIGS. 7, 8 and 9, are adapted to come into trolley propelling position between the pivoted front and rear dogs 40 of the load trolleys T when the transfer chain drive dogs 87 are in the lowered position of those figures. They are limited so as not to fall below this position by suitable stop or spacer means thereon (not shown) which engage the top of the chain link 81.

The vertical position of the dogs 87 is controlled by the fixed cam track 79, each of the dogs 87 being provided at the top of its shank with a horizontally journalled, inwardly extending cam follower roller 89, which rides the track 79. The lowered position of the transfer chain pusher dog 87 is shown in full line in FIG. 9, where the dog traverses the re-entry zone 15 of the installation; and interference in this zone with the driving dog 48 of the main power chain (also shown in dotted line in FIG. 9) is avoided, in the embodiment of the invention under consideration, by spacing the dogs 87 so that they unfailingly and predeterminedly lead the dogs 48. That is, the longitudinal spacing of the dogs 48 relative to one another is a multiple of the relative spacing of the transfer chain dogs 87. Those skilled in the art will understand that an accurately synchronized relationship of the dogs does not limit the relative positions to the arrangement shown in which the transfer chain dog moves through the transfer zone ahead of the main track conveyor dog. The relative position of these two dogs may be altered so that they are moving through the transfer zone on parallel paths, either side by side or one above the other, in which latter case the main track conveyor dog would be above the horizontal pusher portion of the transfer chain dog.

As illustrated best in FIG. 5, the cam 79 terminates at 90 just to the rear of the trolley stop and release mechanism 16 (in reference to the direction of movement of the trolleys indicated by the arrow). The track terminal 90 is downwardly inclined from a short horizontal portion 91, with which portion an upwardly inclined rear ramp portion 92 is joined. This ramp portion 92, commencing at the end 28 (FIG. 4) of the track reach 23, is one onto which the follower rollers 89 ride after leaving the takeup device 21, it being understood that as the dogs 87 traverse and leave the re-entry zone 15 and track reach 26 they are in the lowered position. Ramp 92 elevates the dogs 87 as they converge toward free track 12, so as to avoid possible side collision with a trolley on the latter.

Again referring to FIGS. 5 and 8, the track section 20 has an elongated horizontal hold-down rail 93 bolted or otherwise secured thereon, for the purpose of insuring that the dogs remain in their lowered position in zones where this is intended. Rail 93 commences at a rear portion 94, in which its bottom surface is beveled parallel to the inclined terminus 90 of cam track 79, thus providing a chute 95 into which the follower rollers 89 pass in a vertically restrained manner.

In departing forwardly from the chute 95 the dogs 87 are in their fully lowered position shown in FIGS. 7 and 8, being placed in this position by the rail portion 94 and being thereafter held so by the rail, except in the zone 96 a short distance from the chute 95, which is the stop and release zone. At this zone the bottom of the rail 93 is upwardly recessed to accommodate the rearwardly extending, tongue-like portion 78 of plate cam member 76 in the upwardly swung position of the latter shown in dotted line. The forward end of the recess 96 is downwardly inclined at 97 to again positively lower the dogs 87 after their rollers 89 traverse the recessed zone; and the rail restrains them in this position throughout the remainder of the forward length of tack plate or section, including the re-entry zone 15.

As shown in FIG. 9, the main line power chain 49 is backed up at the zone 15 by a series of rollers R journaled vertically by the superstructure 11, in order to improve stability in the transmission of power to the chain 80 of transfer conveyor 17.

As shown in FIG. 10, when the tongue-like plate cam 76 is in its elevated position (dotted line in FIG. 8) the cam follower rollers 89 of the transfer chain pusher dogs 87 will travel therebeneath, and the dogs 87 are held downwardly by the bottom of cam tongue portion 78 in traversing the zone of recess 96, so as to take propelling engagement with the forward pusher dog 40 of any trolley T awaiting the same at the stop and release mechanism 16.

This is on the assumption that a signal has been received from the empty place spotter 14 which in effect notifies the mechanism 16 that a main line pusher dog 48 is approaching re-entry zone 15 unburdened by a trolley. With such signal the waiting transfer track trolley is picked up by the lowered dog 87 and propelled in exactly timed fashion to the re-entry zone, to be there picked up by the signaling dog 48.

However, if no such signal is received the cam 76 of stop and release unit 16 is lowered to the full line position of FIG. 8, the dog's follower roller 89 rides up the cam tongue portion 78, the dog 87 is elevated so that its propelling foot 88 passes over the dogs 40 of the waiting trolley, and the latter remains unmoved until a proper signal is received.

In order to control movements of cam 76, a second arm of the U-shaped yoke 72 of mechanism 16, pivoted to the superstructure at 74, as shown in FIG. 7, is provided with an integral, downwardly extending extension arm 99, on the free end of which a trolley stop roller 100 is horizontally journaled. Roller 100 is adapted to engage one of the forward load rollers 42 of a trolley T advancing into the stop zone adjacent recess 96. The yoke extension arm 99 is also offset adjacent roller 100 to provide a pivot at 101 for a further short swingable arm 102. Arm 102 carries an inclined shoe 103 at its free end, which shoe is engaged by the advancing trolley load roller 42 prior to its engagement with the stop roller 100, thereby to swing arm 102 slightly upwardly to the solid line position of FIG. 8. Arm 102 is also equipped with a laterally projecting lift lug 104 whose function will appear.

The lug 104 is located on arm 102 for upward engagement by a lift hook member 105 which is pivoted at 106 on one arm 107 of a bell crank 108. This bell crank is pivotally mounted on the superstructure at 109, coaxially of the pivot bearings 73 and 74 for the yoke 72. The other arm 110 of bell crank 108 extends upwardly, its outer terminal being provided with an apertured boss 111, and the pull rod 70 operated by the empty place spotter of FIG. 4 is pivotally connected to the bell crank arm 110 at this point, previously designated 71. Clockwise (FIG. 8) gravitational movement of hook member 105 about its pivot is limited by a stop lug 112 thereon engaging the arm 107 of bell crank 108.

Accordingly, upon operation of the bell crank 108 by a mechanical signal applied through the thrust rod 65 of the empty place spotter and the pull rod 70, the bell crank is swung clockwise, as viewed in FIG. 8. In the event that a trolley T is not present and stopped at the stop zone 96, the arm 102 and its lift lug 104 are in their lowered, dotted line position of FIG. 8, and the upward swing of the hook member 105 as it swings with bell crank 108 does not engage it with the lift lug 104. As a result bell crank arm 99 is not turned (clockwise in FIG. 8) and the cam plate 76 remains in its bottom position.

In this way the next drive or pusher dog 87 will be lifted and will be unable to engage a trolley which arrives after the release signal is given. Furthermore, the stop roller 100 stays in its lower position to insure that a trolley which arrives after the release signal occurs will be stopped.

In other words, every trolley entering the stop and release device 16, under positive propulsion as described, will be halted by the stop and release device, and a trolley will not be released by the device 16 unless it reaches the stop position before the release signal is given. Otherwise, a trolley carrying a load and arriving at a higher speed could pass through the chute 95 before a pusher dog 87 and its roller 89 traverse this zone, stay ahead of the dog, reach the release mechanism stop roller 100 just as it is released and roll ahead to engage a preceding, wrong dog. It is also desirable to halt each trolley to enable a diminution or stoppage of swing of a load pivotally suspended thereon, since the inertia of such movement would also tend to occasion a forward creepage of the trolley out of position for control by device 16. The normal position of a pusher dog 87 at the time a signal is received by the device 16 is approximately at A—A in FIG. 8.

However, with a trolley T present and stopped by roller 100, as shown in FIGS. 7 and 8, the lug 104 has been elevated by the latter to its solid line position; and the next mechanical signal transmitted from the empty place spotter, causing the yoke 72 and bell crank 108 to be swung clockwise about 15°, as viewed in FIG. 8, will first engage the hook 105 beneath the lift lug 104 in the initial 6° of movement, and the further lift of about 9° elevates the stop roller 100 on yoke arm extension 99 out of blocking relation to the waiting trolley T.

This swing of the yoke 72 causes the cam 76 to move upwardly from its solid line position of FIG. 8 (in which it cams the chain dog follower rollers 89 upwardly to elevate the dogs 87 out of driving engagement with the trolleys) to the dotted line position in rail recess 96, in which it serves to hold the dogs 87 in the lowered position of FIG. 8. The result is that the propelling foot 88 of the next dog 87 overtakes the halted trolley and advances the same toward the re-entry zone 15 and main track ways 34.

When the release signal occurs and the yoke 72 swings clockwise, as viewed in FIG. 8, the roller 89 must be to the left of the tip of cam 76 to allow the cam to rise before the roller enters the space under the cam. However, as the yoke 72 swings clockwise, the trolley stop roller 100 is lifted and released. The roller 89 and pusher dog 87 have not as yet come up to the waiting trolley at this moment. If at this time an operator should inadvertently move the load suspended from the trolley in a forward direction, the trolley could travel far enough ahead to come in engagement with a pusher dog 87 at one spacing ahead of the intended pusher dog.

In such case the trolley would enter the converging re-entry zone 15 too early, and the load suspended from the trolley could collide with the load on the trolley ahead of it. This is particularly the case when the trolleys and loads are closely spaced on the power and free lines. Since an important feature of the type of entrance switch herein described is that the mechanically connected elements permit entry into a closely spaced line of traffic, provision is made to prevent such accidental movement of the trolley from the stop position to the preceding pusher dog in the following manner.

Yoke 72 is provided with an additional integral arm 113, on the end of which is a stop 114 which extends sideways from the arm into the path of one of the leading trolley rollers or wheels 42. When the yoke 72 swings clockwise, FIG. 8, to release the trolley, stop 114 swings downward into the path of the trolley wheel. If the trolley is pushed ahead at this moment by means other than the pushed dog, it again comes to a halt against stop 114 to wait for the pusher dog to engage it. This is further insurance against accidental movement of the trolley, as by an inadvertent push by a workman, past the proper control position.

When the empty place spotter 14 returns to its inoperative position pusher dog roller 89 (FIG. 8), while riding under cam 76, prevents the yoke 72 from returning to its stop position until the roller clears the end 115 of cam 76. Now the pusher dog which carries roller 89 has advanced to a position where it is in coupled engagement with the trolley pusher dog. The yoke now turns back to its initial position through the action of its unbalanced weight distribution, and as a result stop 114 is retracted at the precise moment when pusher dog 87 begins to push the trolley. Thus the release mechanism 16 is rendered foolproof, so that even with accidental manual manipulation of the load suspended from the trolley in the stop position, trolley engagement with any but the intended pusher dog is prevented.

The anti-rebound or trolley back stop device 18 appearing in FIG. 4 is not an important factor in the invention as presented in the present application, and is replaced by a simpler version in the second embodiment of the invention. The function of device 18 is apparent from its name, and further details of structure and operation may be had by reference to the parent application.

Operation—Single Trolley Load Suspension

In view of the detailed explanation of the operation of the various components, units or sub-assemblies of the above described embodiment of FIGS. 1 and 4 through 9, it is not believed that further extended description of the operation of the system as a whole is required. The endless transfer conveyor 17 is driven continuously and in a positive fashion by caterpillar engagement of its drive lugs 82 with the links of the main power chain 49, as shown in FIG. 9; and if the power chain halts, as from a power or operating failure, the transfer chain halts also, with no possibility of jamming of trolleys at the re-entry zone 15. The transfer chain is guided with minimum friction and without recourse to any driving or idler sprocket provisions by the track formation 36 of the unitary track and trolley plate 20.

The same unitary track structure controls the movements of the pusher dogs 87 of transfer conveyor 17 in engaging and disengaging a trolley T waiting on the transfer track; and there is positive assurance given by the hold-down rail 93 that the dogs 87 will be depressed for action when and only when they are needed for propelling duty. Track cam 92 elevates the dog 87 of the conveyor as it rounds the track reach 23, thus insuring against possible side collision with a free trolley approaching the stop and release zone along track 12. Once the reach 23 has been rounded, the dog 87 may drop down, or be lowered by cam portion 94, without risk, since the trolley dogs 40 will yield if engaged from above by the descending conveyor dog 87.

This need is determined and satisfied, respectively, by the main track empty place spotter mechanism 14 and the transfer track stop and release mechanism 16. If a trolley T is not being propelled by an advancing main line power chain dog 48, that dog signals its lack of a trolley by occasioning a tensioning of the pull rod 70. The pull rod operates the yoke 72 and bell crank 108 (FIG. 8) to first elevate trolley stop roller 100 from obstructing relation to the trolley T and elevate the tongue-like cam 76 to dotted line position (FIG. 8). The former action involves the lifting of the hook member 105 by bell crank arm 107, and if no trolley is present at the stop and release mechanism 16, the hook member will miss engagement with the lug 104 on arm 102. If the main line dog is occupied by a trolley, the stop roller 100 remains in solid line position.

If a signal has not been received from the empty place spotter, cam 76 remains lowered, the follower roller 89 of the dog rides up the same, elevating its pusher foot 88, and the trolley remains halted at the stop and release unit.

*Dual Trolley Load Suspension—In General*

Reference should now be had, in conjunction with FIGS. 2 and 3, to FIGS. 10 and 11, relating to track structure and associated mechanisms of the second, alternative embodiment for the entrance control of dual trolley suspended load units; to FIGS. 12 through 16, relating more particularly to the stop and release device or mechanism of this alternative installation; and to FIGS. 17 through 20, more particularly relating to the empty place spotter of this installation. Since many structural details and relationships of the modified entrance switch correspond exactly or closely to structural features and relationships of the embodiment of FIGS. 1 and 4 through 9, such corresponding features and relationships will, in the interest of simplicity and brevity, be designated by corresponding reference numerals, primed, and further detailed description thereof and of their operation, will be omitted.

The sole basic difference between the two installations is, as indicated above, that in the embodiment of FIGS. 1 and 4 through 9 the entrance switch mechanism 10 operates by actuation and control from the overhead trolley itself, at both the stop and release mechanism 16 and the empty place spotter mechanism 14, since the trolley T is, as shown in FIG. 6, usually a four-wheel type of short longitudinal wheel span; thus the trolleys may enter and traverse both mechanisms 14 and 16 with the assurance of only a single signal (or omission to signal) from spotter to stop and release mechanism.

However, in the case of a load unit or bumper B' suspended, as indicated in FIGS. 2, 3 and 12, by swiveled action from forward and rearward overhead trolley pairs T', T'ª of the two-wheel type, it is necessary to effect the stop and release control at a mechanism 16' in part from the front trolley and in part from bumper B', as distinguished from a trolley part or parts alone, such as a wheel thereof. Otherwise, the spacing of the forward and rearward trolleys in a considerable lengthwise span would result in dual successive halting actions at the respective trolleys T', T'ª with disastrous result. Similarly, it is necessary to let the dual trolley and its bumper B' through an empty place spotter 14 without undesired retripping of the latter by the trailing trolley T'ª of this unit.

Hence, the embodiment of FIGS. 10 through 20 makes provision for the stoppage of the advancing trolley pair and its load by abutment with the load bumper B' adjacent a forward portion of the latter, in the vertical zone of the point at which the trolley signals its entrance into the stop and release device or mechanism 16' by engagement of its forward trolley with a part of that mechanism, i.e., simultaneously with its stoppage by stoppage of its suspended bumper.

*Track Structure*

Although the embodiment of FIGS. 10 through 20 may incorporate the bent plate type of track structure illustrated in FIGS. 4 and 5 in connection with the earlier form, it is shown in FIGS. 10–20 (particular reference being had to FIGS. 10 and 11) in a somewhat more conventionalized form. A suitable horizontal superstructure 117 is provided hanging components of the main power track 13' and transfer track 12', the superstructure including inverted U-shaped hangers 118 welded to the main power trolley monorail track or I beam and at the lower ends thereof supporting the free and main line track members 12', 13', respectively, along which trolleys ride, whether freely or as propelled by the main line power chain. An elongated transfer chain and trolley control track 10' extends about the major portion of the length of travel of the transfer conveyor chain 17', being in the form of a channel 119 of C-shaped cross section, oriented sidewise with the top and bottom flanges 120 thereof extending horizontally outwardly, and with the transfer chain 17' riding the bottom flange.

A chain take-up component 21' may be associated with the track 10', being of a simplified nature including an arcuate portion 121 of approximately 180° extent, also of channel section, having provisions, generally designated at 122 (FIG. 10) for its adjustment to enable proper chain tension to be maintained, such provisions being suitably sustained by the superstructure 117. The upper flange 120 of track 10' is cut away at the actual re-entry zone 15'.

While the track structure differs in outline from that shown in FIG. 4, it has similar provisions for the control of the lead trolleys T' of each dual trolley unit traversing the same. That is, as the trolleys move in the direction indicated by arrows in FIG. 10, the control rollers 89' of the transfer pusher dogs 87' thereof are elevated by a cam 92' secured on the track structure 10' adjacent the zone of convergence thereof with the free trolley track 12', thus to vertically clear such transfer chain dogs in relation to the dogs 40' of any trolley advancing on the track 12' and avoid side collision. Likewise, it will be noted that the cam 92' is in this instance mounted on the chain take-up section 21' of transfer track structure 121, as shown in FIGS. 10 and 11. A fixed cam 123 is provided on the track 10' in advance of stop and release device 16' to depress the transfer chain dogs 87' to position for driving engagement with free trolleys T" being fed to the stop and release mechanism. Such cam corresponds in function to the hold down rail 93 of the first embodiment.

The transfer chain track channel 119 is, as in the first embodiment, cut away at 125 (in this instance downwardly) to accommodate the movable control cam 76' of stop and release mechanism 16'; and an upwardly bent bridge piece 126 is fixed to the top flange 120 of the track to bridge the cut-away zone. This piece is provided with a set screw 127 which upwardly limits adjustably the movement of cam 76'. Furthermore, the track is provided in this zone with an adjustable stop 128 in the form of an eccentrically mounted circular plate with which the cam 76' engages downwardly to limit its lowered position. Such position may be adjusted by rotating the eccentric plate 128 and locking it in desired adjustment.

FIGS. 10, 11 and 13 show the connecting rod 70' of the linkage by which the empty place spotter 14' (not appearing in those figures but shown in FIGS. 17–20, inclusive) is operatively connected to the stop and release mechanism 16' for the accurately timed control of the latter, much in the manner of the embodiment of FIGS. 1 and 4 through 9.

Directly forwardly of the zone of operation of the trolley dog control cam 76' (i.e., in the direction toward which free trolleys travel) the chain track 119 has fixed to its upright web, preferably by an adjustable mount, a mounting plate 130 of substantial thickness, by which bell crank and like moving parts of the stop and release mechanism 16' are appropriately mounted, in a manner to be described; and it will be noted that in the embodiment under consideration, these parts are considerably simplified and more compact than in the first form, the space consuming yoke structure 72 of the embodiment of FIGS. 1 and 4 through 9 being eliminated.

Similarly, one member 33' of the free trolley track 12', beneath the transfer chain track 119, has secured thereto, preferably also adjustably, a further plate 131 by which movable parts of the stop and release mechanism 16', as engaged and controlled by abutments on the trolley-suspended load bumpers B', are mounted.

*Dual Trolley and Bumper Installation*

The stop and release mechanism is further and in greater detail illustrated in FIGS. 13–16, inclusive; however, in order to better understand the purpose and operation of this mechanism, reference should first be made to FIG. 12 of the drawings, in conjunction with schematic FIGS. 2 and 3, for an illustration of the load bumper B' as sustained from longitudinally spaced, fore and aft points by a pair of front and rear trolleys T' and T'a, respectively, to enable the relatively elongated load to pass freely about a track bend, in the manner shown in FIG. 2. These trolleys are, in general, preferably similar to the two-wheel type of trolley illustrated and described in the copending application of Leonard J. Bishop and Paul Klamp, entitled, "Load Bearing Trolley and Trolley Accumulation Mechanism," Serial No. 65,674, filed October 28, 1960, although lacking certain trolley and load accumulation features constituting part of the subject matter of that application.

Thus, as shown in FIG. 12, the forwardmost trolley T' is the trolley by which the load bumper B' is propelled along the transfer path in approaching the re-entry zone 15'. It comprises a sheet metal body 39' within and adjacent the top of which the pair of forward and rearward dogs 40' are pivotally mounted for engagement by the transfer chain dog 87', in the usual manner. A pair of axially aligned track wheels or rollers 42' are journaled on this body at each side of and centrally of the length of the latter; and guide rollers 41' are mounted on the body 39' on upright axes to traverse the space between the transfer and main trolley track members 33', 34', respectively, in the usual manner.

Adjacent the bottom and at the longitudinal center thereof the trolley body 39' has fixed thereon a vertically depending swivel pin 133; and this pin extends downwardly through a central top opening in a sheet metal bumper suspending member 134 of inverted U-shaped cross section. This member is appropriately secured fixedly to the bumper B' at the transverse center of the latter, being as shown in FIG. 12, located adjacent a forward portion of the bumper. The member 134 is suspended from swivel pin 133 by a roller bearing 135 and take-up nut 136, with provision in the form of a pair of rounded surfaced bearing members 137, 138 encircling the pin, to enable some degree of vertical rock of hanger relative to trolley body 39', if desired. However, this is not of the essence in the present invention, nor are the particular provisions to enable the desired relative horizontal swivel of the bumper mount in relation to the trolleys T', T'a, so long as some provision is made to this end.

The rear trolley T'a is identical to the forward, save for the fact that it omits the top pivoted pusher dogs, inasmuch as the whole trolley propelling action is exerted at the forward trolley T' and further propelling means are not desired in the embodiment under consideration. It is seen that the dual trolley arrangement of FIG. 12 permits the free action of the load unit in rounding the track bend which is shown in FIG. 2 of the drawings.

Now referring to FIGS. 13, 14, 15 and 16, the mounting plate 130 secured to transfer chain and trolley control track 119 has fixedly secured thereto, preferably by welding, a heavy duty pivot pin 140 projecting horizontally outwardly therefrom, and inwardly of the chain track outline as appears in FIGS. 10 and 11. A primary bell crank 108' (similar to the corresponding bell crank 108 of FIG. 8) is journaled by a bearing 141 on the outer end of pin 140; and the upwardly extending arm 110' of this bell crank is pivotally connected to the rod 70'.

A lift hook member 105' is pivotally mounted on the outer end of the other arm 107' of the bell crank. Member 105' is similar to the hook member 105 of the first embodiment, although differing therefrom in outline. The function is the same; and the gravity-biased movement of hook member 105' is limited by engagement of its stop lug 112' with a set screw 143 adjustable on an extreme outer extension 144 of the primary bell crank arm 107'. As in the first embodiment, the extension arm 107' rotates with bell crank 108' upon manipulation of the upwardly extending arm 110' of the latter, although not through the agency of a yoke, as in the first embodiment.

The swing arm 102' with which the lift hook 105' coacts is, in this embodiment, in the outline of a medially pivoted bell crank, with the trolley roller-operated control shoe 103' on one arm thereof and the lift lug 104' on the other arm thereof. However, here again the functioning is the same, in that the shoe 103' is engaged and elevated by a roller 42' of the trolley T' entering the stop and release zone, thus to rock swing arm 102' counterclockwise (FIG. 13) into position for lifting engagement of its lug 104' by the lift hook 105'.

The swing member 102' is pivotally mounted at 146 on the outer end of a secondary arm 147 corresponding in function with the yoke extension arm 99 of the first embodiment. Arm 147 is pivoted, inwardly of bell crank 108', on the same pin 140 which pivots the latter (see FIG. 15). It has an offset portion 148 extending laterally from the side of a thickened top boss 149 at which it is pivoted; and this offset adjustably receives a pair of set screws 150 which engage downwardly upon an arm 151 by which the transfer chain dog control cam 76' is carried. Arm 151 is mounted, as by a screw or stud 152 to one side of the boss 149 and beneath the offset 148, and adjustment of the screws 150 enables the angle of cam arm 151 relative to secondary arm 147 (with which it moves as a unit) to be adjusted, thus properly setting cam 76' in relation to the trolley control track 119.

Accordingly, it is seen that as the secondary arm 147 is lifted by engagement of the bell crank supported lift hook member 105' beneath lift lug 104' of the swing arm 102', the trolley dog control cam 76' will be similarly lifted, after the short time delay explained in connection with the first embodiment. These arrangements constitute a very compact and efficient operating linkage by which the stop and release mechanism 16' is conditioned as to its cam 76' for operation upon approach of a trolley to the stop zone thereof.

Next to be considered is the means to control the stop and release of the trolley and its load entering the stop and release station, in this case under actuation by the load unit or bumper entering the stop and release station, rather than by the trolley proper.

To this end, and as best illustrated in FIGS. 13, 15 and 16, each load bumper B' is provided with a fixed master stop abutment or block 154 on one side thereof, preferably (in the interest of compactness and better operation in general) directly beneath a roller 42' of the forward roller pair of its trolley T' which engages and actuates the control shoe 103'. In any event, the block 154 is mounted to project from the carrier or bumper B' in a certain predetermined relation, position-wise, to the latter and to the trolley which engages it, depending upon the particular installation involved. Needless to say, the block 154 is the only element projecting in a given direction in any given zone longitudinally of the load carrier or bumper B', i.e., of its direction of travel. Otherwise, a duplication of the action involving block 154 would occur. For coacting with this master stop 154, the plate 131 on the trolley track 33' therebeneath has an arm 155 pivotally mounted thereon at 156, with a stop roller 157 (corresponding in function to the roller 100 of the first embodiment) journaled on the end of this arm at 158.

An adapter bracket 159 is welded or otherwise secured to the arm 155 to extend upwardly thereof, and a connecting rod or link 160, suitably adjustable as to length, is pivotally mounted on bracket 159 at 161. This arm extends upwardly to a pivotal connection at 162 to an intermediate point along the length of the secondary arm 147.

It follows that, upon lifting of this secondary arm 147 through the connections described above, i.e., the lifting of arm 147 by hook member 105' (once the swing member 102' has been properly positioned upon engagement of its shoes 103' by the trolley roller 42', and upon a signal from the empty place spotter 14' to swing bell crank 108' clockwise), the lower pivoted, track mounted arm 155 is lifted through the agency of connecting link 160, thus to elevate the stop roller 157 on said arm out of position to engage and maintain halted the load bumper B' (and the trolley T' directly thereabove). These actions take place in consequence of the reception from the empty place spotter 14', as in the first embodiment, of a signal to the effect that a power chain pusher dog 48' is approaching the entry zone 15' unencumbered by a trolley on the main line 13'. The result is that, as previously, the now-released trolley T' at the stop and release station 16' is picked up by the next advancing transfer chain dog 87', the latter passing beneath the elevated cam 76', and forwarded to the entry zone 15' in accurately timed relation to the advancing, empty power chain dog, due to the accurately synchronized and spaced relationship of the respective dogs on the respective transfer and power chains 17' and 49'.

In lieu of the anti-rebound stop device 18 of the first embodiment, the form of FIGS 2, 3 and 10 employs a simple anti-rebound dog 164 (see FIG. 13) pivoted at 165 on a bracket 166 fixed to free trolley track 33'. This stop dog rides over the bumper stop 154 as bumper B' is propelled into the stop and release station, dropping behind the stop 154 to prevent undue rebound of the load at that station. As shown in FIGS. 13 and 16, the bracket 166 is mounted fixedly beneath the stop and release station and carries a top horizontal flange 167 which downwardly restrains one of the trolley rollers 42' as they enter that station. A similar fixed bracket 168 (FIG. 16) may similarly restrain the other roller.

For the purpose of preventing undesired and premature travel of the load out of the stop and release zone (i.e., unduly prior to its desired propelling engagement by a transfer chain dog 87'), the mechanism 16' features an arm 113' in the form of an extension of the roller-bearing stop arm 155, the arm 113' carrying a stop 114' at its end. The function of these members is exactly the same as the arm 113 and stop 114 of the first embodiment, save for the fact that stop 114' exerts its action on the bumper stop 154, rather than on a trolley roller 42'.

It has been noted above that the load bumper B' carries but a single stop abutment 154, preferably immediately beneath the forward trolley load roller 42' which trips the control shoe 103' of the stop and release mechanism, similarly that the rear trolley T'ᵃ of the load unit has no propelling dog. It follows that the trolley T'ᵃ and bumper pass without further halting or retardation through the stop and release zone 16', despite the considerably spaced span of the respective trolleys associated with the bumper in question.

This is permitted in part because the empty place spotter 14' along side of the main track line 13' is and must also be governed, as to its initiation or non-initiation of a signal through connecting rod 70' to the stop and release mechanism 16', only by the respective absence or presence on track 13' of a forward trolley T' under propulsion by a power chain pusher dog 48', and in no event in response to the presence of a rear trolley T'ᵃ of a load. Thus, it is necessary that, when a load bumper B' suspended by the long-spanned forward and rearward trolleys T' and T'ᵃ, respectively, is being powered along main line track 13' toward the entry zone 15', the rear trolley T'ᵃ be past the trolley-tripped arm or lever (corresponding to the arm 56 of the first embodiment) prior to the tripping of the reset arm or lever (corresponding to the member 60 of the first embodiment) by the forward trolley T' of that load unit. Otherwise, a second, false signal will be initiated at the empty place spotter mechanism 14' which would place the stop and release mechanism 16' in an inoperative position, notwithstanding the fact that a following power chain pusher dog or dogs 48' was or were unoccupied by a main line trolley.

*Empty Place Spotter*

To the foregoing ends the modified arrangements shown in FIGS. 17–20, inclusive, of the drawings are made, concerning which parts and relationships corresponding to those illustrated in FIG. 4 are designated by corresponding reference numerals, primed, and do not require further specific description in great detail.

The swinging yoke 54' is in the form of a casting 170, clamped at upper and lower bosses 171, 172 to a vertical rod 53' of non-circular section which serves as a pivot for the yoke, this rod being pivoted at its top and bottom in the top and bottom flanges 173, 174 of a bracket 175 fixedly secured at its top and bottom to the monorail main power trolley track 13' and to a trolley track 34' of the main trolley line. Beneath the yoke 54' the pivot rod 53' has a yoke actuating arm 176 clamped through and at an enlarged hub 177 of that arm, so that trolley-responsive swinging of the actuating arm 176 correspondingly swings the yoke 54' about its vertical axis at rod 53'.

The swinging arm 56' of the empty place spotter 14' has its boss 178 clamped to a pin 179 of non-circular section, which pin is pivoted on an upright axis by a plate extension 180 constituting a part of the bracket 175, extending outwardly to one side of and beneath the main line track 34'. Swinging arm 56' is provided with a vertically extending pin 182 which is received within an angled cam slot 183 adjacent the free end of actuating arm 176, so that as the arm 56', extending through a horizontal slot 184 in the track 34', is swung counter-clockwise (as viewed in FIG. 17) by the guide roller 41' of a forward trolley T' entering the empty place spotter zone, the actuating arm 176 will be swung counterclockwise about its pivot at rod 53', and the yoke 54' will be correspondingly swung counterclockwise about the same axis. Since the lower operating arm 63' is vertically positioned at an elevation such that an anti-friction roller 186 on its outer end (see FIGS. 17 and 20) will be engaged and operated only by a chain dog 48' powered along track 13', it follows that the swinging of yoke 54' occasioned by prior engagement of a trolley with the arm 56' will swing yoke 54' from the solid line to the dotted line position of FIG. 17, preventing the chain dog operation of the arms 63' and 62' counterclockwise in a manner to actuate the connecting rod 65' and the stop and release mechanism 16'.

The counterclockwise swing of trolley-tripped arm 56' about its pivot at 179 causes the pin 182 on arm 56', in moving yoke actuating arm 176 from the solid to the dotted line position of FIG. 19, to move out to the left-hand end of slot 183, as shown in that figure, the motion of the pin being resisted by a coil tension spring 188 acting betwen the pin and a fixed post 189 on track extension 180. This positions these parts for reset as the trolley T' departs from the empty place spotter station, in a manner to be described. As indicated above, it is essential that the second, trailing trolley T'ᵃ associated with the load unit shall have passed the swinging trolley-tripped control arm 56', in the tripped, dotted line position thereof shown in FIGURE 19, before that arm is reset to its solid line, operative position, ready to be tripped by the first trolley of a following load unit.

To this end, the reset lever 191 is employed (see FIGS. 17 and 18) whose function is identical to that of the arm 60 of the first embodiment, although it differs therefrom in form, being a straight member medially pivoted at 181 upon a bracket 192 fixed to and extending from the side of a track 34'. Its inner end projects through a slot 193 in this track into the space between the latter and the other track, in which the trolley guide rollers 41 travel, and is engaged by one thereof to be swung from the dotted line to the solid line position of FIG. 17. At its opposite end, the reset arm 191 is pivoted at 194 to a connecting rod 195, which extends a considerable distance rearwardly (or to the right as viewed in FIGS. 17 and 18) to a pivotal connection to the pin 182 carried by swinging control arm 56'. The length of the connecting rod 195 and the position of the reset arm 191 forwardly of the arm 56' will be governed by the longitudinal spacing of the forward and rearward trolley T', T'ᵃ, respectively, associated with a load bumper B', on the understanding set forth above that the trolley T'ᵃ must have cleared control arm 56' before the forward trolley T' trips reset arm 191.

Thus, assuming that counterclockwise (FIG. 19) actuation of arm 56' by a trolley guide roller 41' has placed pin 182 in the left-hand end of the slot 183 of yoke actuating arm 176, in being swung to the dotted line position of FIG. 19 and (through connecting rod 195) placing the reset arm 191 in its dotted line position of FIG. 17, the reverse (counterclockwise) swing of arm 191 to solid line position by the forward trolley T' will restore other parts of the empty place spotter to their operative positions shown in FIGS. 17 and 19. This involves the direct action of pin 182 on arm 56' to swing the same clockwise to solid line position, and the simultaneous camming action of pin 182 in slot 183 of actuating arm 176, to swing yoke 54' from its solid to its dotted line position of FIG. 17, restoring lower operating arm 63' and upper operating arm 62' to their operative, solid line positions.

Obviously, as in the first embodiment, when a main line pusher dog 48' operating the empty place spotter 14' is unencumbered by any load bumper B' and/or its load trolleys T', T'ᵃ, nothing happens by way of tripping of the control arm 56', power chain pusher 48' trips the lower operating arm 63', and the accompanying swing of upper arm 62' drives connecting rod or link 65' to the left as viewed in FIG. 17 (or downwardly as viewed in FIG. 10). Through the agency of bell crank 68', the further connecting rod or link 70' is actuated to operate the stop and release mechanism 16' in the manner described above.

In order to insure proper tripping of the anti-friction roller 186 of the lower operating arm 63' by a power chain dog 48', a set of back-up rollers 197 for the power chain 49', appropriately mounted by a track 198 suitably suspended from the superstructure 117, is provided.

What we claim as our invention is:

1. A transfer control mechanism for a conveyor system by which trolleys and load members supported thereby are transferred from one track to a further track in convergent relation thereto at a transfer zone, said members having abutment means thereon in predetermined relation thereto and to trolleys supporting the respective members, said mechanism comprising driven conveyors having longitudinally spaced propelling members moving continuously adjacent and along said respective tracks, means to guide said conveyors for movement of the respective propelling members thereof through said transfer zone in position to engage the said propelling members of each thereof with said trolleys in passing through said zone, and control means toward which said trolleys and load members are forwarded by one of said conveyors, said control means acting to control transfer of trolleys and load members from said one track to said further track at said transfer zone, and comprising members engaged and actuated respectively by said trolleys and by the abutment means of the respective load members supported by the trolleys.

2. A transfer control mechanism for a conveyor system by which trolleys and load members supported thereby are transferred from one track to a further track in convergent relation thereto at a transfer zone, said members having abutment means thereon in predetermined relation thereto and to trolleys supporting the respective members, said mechanism comprising driven conveyors having longitudinally spaced propelling members moving continuously adjacent and along said respective tracks, means to guide said conveyors for movement of the respective propelling members thereof through said transfer zone in position to engage said propelling members of each thereof with said trolleys in passing through said zone, in an accurate relationship of the propelling members of the respective conveyors to one another in the direction of their travel at said zone, means driving said conveyors for accurately synchronized movement at said transfer zone, and control means to which said trolleys and load members are positively driven by one of said conveyors, said control means acting to insure an accurately timed transfer of trolleys and load members from said one track to said further track at said transfer zone, and comprising members engaged and actuated respectively by said trolleys and by the abutment means of the respective load members supported by the trolleys.

3. A transfer control mechanism for a conveyor system by which trolleys and load members supported thereby are transferred from one track to a further track in convergent relation thereto at a transfer zone, said members having abutment means thereon in predetermined relation thereto and to trolleys supporting the respective members, said mechanism comprising driven conveyors having longitudinally spaced propelling members moving continuously adjacent and along said respective tracks, means to guide said conveyors for movement of the respective propelling members thereof through said transfer zone in position to engage said propelling members of each thereof with said trolleys in passing through said zone, in an accurate relationship of the propelling members of the respective conveyors to one another in the direction of their travel at said zone, means driving said conveyors for accurately synchronized movement at said transfer zone, and control means toward which said trolleys and load members are forwarded by one of said conveyors, said control means acting to control transfer of trolleys and load members from said one track to said further track at said transfer zone, said control means comprising a device adjacent said one track having means to engage the abutment means of the load member of a trolley thus forwarded to said control means, and thereby halt the trolley and load member, and means to engage the trolley of said load member to condition said device for operation, means to disengage said trolley and the propelling member of said one conveyor from driving relation to one another, and means to re-engage said trolley with a following propelling member of said one conveyor for advance to said transfer zone.

4. A transfer control mechanism for a conveyor system by which trolleys and load members supported thereby are transferred from one track to a further track in convergent relation thereto at a transfer zone, said members having abutment means thereon in predetermined relation thereto and to trolleys supporting the respective members, said mechanism comprising driven conveyors having longitudinally spaced propelling members moving continuously adjacent and along said respective tracks, means to guide said conveyors for movement of the respective propelling members thereof through said transfer zone in position to engage said propelling members of each thereof with said trolleys in passing through said zone, in an accurate relationship of the propelling members of the respective conveyors to one another in the direction of their travel at said zone, means driving said conveyors for accurately synchronized movement at said transfer zone, and control means to which said trolleys and load members are positively driven by one of said conveyors, said control means acting to insure an accurately timed transfer of trolleys and load members from said one track to said further track at said transfer zone, said control means comprising a device adjacent said one track having means to engage the abutment means of the load member of a trolley thus positively driven to said control means, and thereby halt the trolley and load member, and means to engage the trolley of said load member to condition said device for operation, means to disengage said trolley and the propelling member of said one conveyor from driving relation to one another, and means to re-engage said trolley with a following propelling member of said one conveyor for advance to said transfer zone.

5. A transfer control mechanism for a conveyor system by which trolleys and load members supported thereby are transferred from one track to a further track in convergent relation thereto at a transfer zone, said members having abutment means thereon in predetermined relation thereto and to trolleys supporting the respective members, said mechanism comprising driven conveyors having longitudinally spaced propelling members moving continuously adjacent and along said respective tracks, means to guide said conveyors for movement of the respective propelling members thereof through said transfer zone in position to engage said propelling members of each thereof with said trolleys in passing through said zone, in an accurate relationship of the propelling members of the respective conveyors to one another in the direction of their travel at said zone, means driving said conveyors for accurately synchronized movement at said transfer zone, and control means to which said trolleys and load members are positively driven by one of said conveyors, said control means acting to insure an accurately timed transfer of trolleys and load members from said one track to said further track at said transfer zone, said control means comprising a device adjacent said one track having means to engage the abutment means of the load member of a trolley thus positively driven to said control means, and thereby halt the trolley and load member, and means to engage the trolley of said load member to condition said device for operation, means to disengage said trolley and the propelling member of said one conveyor from driving relation to one another, and means to re-engage said trolley with a following propelling member of said one conveyor for advance to said transfer zone, and means adjacent said further track controlled by trolleys and propelling members of the other conveyor traveling to said transfer zone to operate said device for said re-engagement in accordance with whether or not the last named propelling members bear loads.

6. A transfer control mechanism for a conveyor system by which trolleys and load units propelled by a continuously moving conveyor along one track are transferred to a further track in convergent relation at a transfer zone to said one track, said load units each comprising a load member and front and rear trolleys having elements connecting the same to the load member to support the latter, said conveyor having longitudinally spaced members adapted to engage and propel said load units on said one track to a control device adjacent the latter, said device acting to accurately control the transfer at said transfer zone of a trolley and load unit from said one track to said further track, and comprising means to engage and halt at said device the trolley supported load member of a dual-trolley load unit thus propelled to said device by said conveyor, and means engaged by one of the trolleys of said load unit to condition said device for operation, means to disengage the last named trolley from driving engagement by said conveyor, as halted by said last named means, and means to re-engage the halted trolley in driving engagement with a following propelling member of said conveyor for advance to the zone of convergence of said tracks.

7. A transfer control mechanism for a conveyor system by which trolleys and load units propelled by a continuously moving conveyor along one track are transferred to a further track in convergent relation at a transfer zone to said one track, said load units each comprising a load member and front and rear trolleys having elements pivotally connecting the same to the load member to support the latter, said conveyor having longitudinally spaced members movably mounted thereon adapted to engage and propel said load units on said one track to a control device adjacent the latter, said device acting to accurately control the transfer at said transfer zone of a trolley and load unit from said one track to said further track, and comprising means to engage and halt at said device the trolley supported load member of a dual-trolley load unit thus propelled to said device by said conveyor, and means engaged by one of the trolleys of said load unit to condition said device for operation, means to disengage the last named trolley from driving engagement by said conveyor, as halted by said last named means, by moving a propelling member of said conveyor relative to the latter and out of propelling engagement with the trolley, and means to re-engage the halted trolley in driving engagement with a following propelling member of said conveyor for advance to the zone of convergence of said tracks.

8. A transfer control mechanism for a conveyor system by which trolleys and load units propelled by a continuously moving conveyor along one track are transferred to a further track in convergent relation at a transfer zone to said one track, said load units each comprising a load member and front and rear trolleys having elements connecting the same to the load member to support the latter, said conveyor having longitudinally spaced members adapted to engage and propel said load units on said one track to a control device adjacent the latter, said device acting to accurately control the transfer at said transfer zone of a trolley and load unit from said one track to said further track, and comprising means to engage and halt at said device the trolley supported load member of a dual-trolley load unit thus propelled to said device by said conveyor, and means engaged by one of the trolleys of said load unit to condition said device for operation, means to disengage the last named trolley from driving engagement by said conveyor, as halted by said last named means, and means to re-engage the halted trolley in driving engagement with a following propelling member of said conveyor for advance to the zone of convergence of said tracks, and means operating adjacent said further track and operatively connected to said control device to release said load member of the halted trolley from said halting engagement by said first named means to permit said advance.

9. A transfer control mechanism for a conveyor system by which trolleys and load units propelled by a continuously moving conveyor along one track are transferred to a further track in convergent relation at a transfer zone to said one track, said load units each comprising a load member and front and rear trolleys having elements connecting the same to the load member to support the latter, said conveyor having longitudinally spaced members movably mounted thereon adapted to engage and propel said load units on said one track to a control device adjacent the latter, said device acting to accurately control the transfer at said transfer zone of a trolley and load unit from said one track to said further track, and comprising means to engage and halt at said device the trolley supported load member of a dual-trolley load unit thus propelled to said device by said conveyor, and means engaged by one of the trolleys of said load unit to condition said device for operation, means to disengage the last named trolley from driving engagement by said conveyor, as halted by said last named means, by moving a propelling member of said conveyor relative to the latter and out of propelling engagement with the trolley, and means to re-engage the halted trolley in driving engagement with a following propelling member of said conveyor for advance to the zone of convergence of said tracks, and means operating adjacent said further track and operatively connected to said control device to release said load member of the halted trolley from said halting engagement by said first named means to permit said advance.

10. A transfer control mechanism for a conveyor system by which load units including a trolley and load member supported thereby are propelled by a continuously moving conveyor along one track for transfer to a further track in convergent relation at a transfer zone to said one track, said conveyor having longitudinally spaced members movably mounted thereon adapted to engage and propel said first named trolleys on said one track to a control device adjacent the latter, said device having means engaging respectively said first named trolleys and the load members thereof and acting to accurately control the transfer at said transfer zone of a trolley and load unit from said one track to said further track, and an empty place spotter positioned adjacent said further track and operatively connected to said device to prevent said re-engagement of said halted load unit and said following propelling member, upon operation of the spotter by a load unit traveling on said further track toward said transfer zone.

11. A transfer control mechanism for a conveyor system by which load units including a trolley and load member supported thereby are propelled by a continuously moving conveyor along one track for transfer to a further track in convergent relation at a transfer zone to said one track, said conveyor having longitudinally spaced members movably mounted thereon adapted to engage and propel said first named trolleys on said one track to a control device adjacent the latter, said device having means engaging respectively said first named trolleys and the load members thereof and acting to accurately control the transfer at said transfer zone of a trolley and load unit from said one track to said further track, and comprising means to halt at said device a trolley and load unit thus propelled to said device by said conveyor by engaging the load member of said unit, means controlled by said first named trolley to disengage the last named load unit from driving engagement by said conveyor, and means to re-engage said halted load unit in driving engagement with a following propelling member of said conveyor for advance to the zone of convergence of said tracks, and an empty place spotter positioned adjacent said further track and operatively connected to said device to prevent said re-engagement of said halted load unit and said following propelling member, upon operation of the spotter by a load unit traveling on said further track toward said transfer zone.

12. A transfer control mechanism for a conveyor system by which load units including a trolley and load member supported thereby are propelled by a continuously moving conveyor along one track for transfer to a further track in convergent relation at a transfer zone to said one track, said conveyor having longitudinally spaced members movably mounted thereon adapted to engage and propel said first named trolleys on said one track to a control device adjacent the latter, said device having means engaging respectively said first named trolleys and the load members thereof and acting to accurately control the transfer at said transfer zone of a trolley and load unit from said one track to said further track, and comprising means to halt at said device a trolley and load unit thus propelled to said device by said conveyor by engaging the load member of said unit means controlled by said first named trolley to disengage the last named load unit from driving engagement by said conveyor by moving a propelling member of the latter relative thereto out of propelling engagement with the trolley of said load unit, and means to re-engage said halted load unit in driving engagement with a following propelling member of said conveyor for advance to the zone of convergence of said tracks, and an empty place spotter positioned adjacent said further track and operatively connected to said device to prevent said re-engagement of said halted load unit and said following propelling member, upon operation of the spotter by a load unit traveling on said further track toward said transfer zone.

13. A transfer control mechanism for a conveyor system by which load units including a trolley and load member supported thereby are propelled by a continuously moving conveyor along one track for transfer to a further track in convergent relation at a transfer zone to said one track, said conveyor having longitudinally spaced members movably mounted thereon adapted to engage and propel said first named trolleys on said one track to a control device adjacent the latter, said device having means engaging respectively said first named trolleys and the load members thereof and acting to accurately control the transfer at said transfer zone of a trolley and load unit from said one track to said further track, and an empty place spotter positioned adjacent said further track and operatively connected to said device to prevent said re-engagement of said halted load unit and said following propelling member, upon operation of the spotter by a load unit traveling on said further track toward said transfer zone, including means engageable respectively by said trolleys traveling said further track and by a conveyor adapted to propel said last named trolleys.

14. A transfer control mechanism for a conveyor system by which load units including a trolley and load member supported thereby are propelled by a continuously moving conveyor along one track for transfer to a further track in convergent relation at a transfer zone to said one track, said conveyor having longitudinally spaced members movably mounted thereon adapted to engage and propel said first named trolleys on said one track to a control device adjacent the latter, said device having means engaging respectively said first named trolleys and the load members thereof and acting to accurately control the transfer at said transfer zone of a trolley and load unit from said one track to said further track, and comprising means to halt at said device a trolley and load unit thus propelled to said device by said conveyor by engaging the load member of said unit, means controlled by said first named trolley to disengage the last named load unit from driving engagement by said conveyor, and means to re-engage said halted load unit in driving engagement with a following propelling member of said conveyor for advance to the zone of convergence of said tracks, and an empty place spotter positioned adjacent said further track and operatively connected to said device to prevent said re-engagement of said halted load unit and said following propelling member, upon operation of the spotter by a load unit traveling on said further track toward said transfer zone, including means engageable respectively by said trolleys traveling said further track and by a conveyor adapted to propel said last named trolleys.

15. A transfer control mechanism for a conveyor system by which load units propelled by a continuously moving conveyor along one track are transferred to a further continuously moving conveyor paralleling a further track which is in convergent relation at a transfer zone to said one track, said conveyors having longitudinally spaced members adapted to engage and propel said load units, said load units each comprising a pair of track engaging load trolleys spaced from one another in the direction of travel of the unit, one of which is adapted to be engaged by a propelling member to so propel the unit, and a load member supported by said trolleys, a control device adjacent said one track acting to accurately control the transfer at said transfer zone of a load unit from said one track to said further track, and an empty place spotter positioned adjacent said further track and operatively connected to said device to selectively prevent said re-engagement of said halted load unit and said following propelling member, upon operation of the spotter by a load unit traveling on said further track toward said transfer zone, said spotter comprising a first member adapted to be engaged and operated by a propelling member of said further conveyor, a second member adapted to be engaged and operated by the leading trolley of a load unit traveling said further track, means operatively connecting said first member to said control device to actuate the latter, means operatively connecting said second member to said first member to shift the same and nullify said operation of the first member upon engagement and actuation of said second member by said last named trolley, and a reset device operatively connected to said first member to reset the same from the shifted position thereof, said reset device being engageable and operable by said leading trolley at a point spaced longitudinally forwardly of said second member to enable the following trolley to pass said second member prior to actuation of the reset by said leading trolley.

16. A transfer control mechanism for a conveyor system by which load units propelled by a continuously moving conveyor along one track are transferred to a further continuously moving conveyor paralleling a further track which is in convergent relation at a transfer zone to said one track, said conveyors having longitudinally spaced members adapted to engage and propel said load units, said load units each comprising a pair of track engaging load trolleys spaced from one another in the direction of travel of the unit, one of which is adapted to be engaged by a propelling member to so propel the unit, and a load member supported by said trolleys, a control device adjacent said one track acting to accurately control the transfer at said transfer zone of a load unit from said one track to said further track, said device comprising means to engage said load member of a load unit thus propelled to said device by said conveyor and thus halt the load unit at the device, means controlled at least in part by engagement with one of said trolleys to disengage the last named load unit from driving engagement by a propelling member of said first named conveyor, and means to re-engage said halted load unit in driving engagement with a following propelling member of said first named conveyor for advance to the zone of convergence of said track, and an empty place spotter positioned adjacent said further track and operatively connected to said device to prevent said re-engagement of said halted load unit and said following propelling member, upon operation of the spotter by a load unit traveling on said further track toward said transfer zone, said spotter comprising a first member adapted to be engaged and operated by a propelling member of said further conveyor, a second member adapted to be engaged and operated by the leading trolley of a load unit traveling said further track, means operatively connecting said first member to said control device to actuate said re-engaging means of the latter, means operatively connecting said second member to said first member to shift the same and nullify said operation of the first member upon engagement and actuation of said second member by said last named trolley and a reset device operatively connected to said first member to reset the same from the shifted position thereof, said reset device being engageable and operable by said leading trolley at a point spaced longitudinally forwardly of said second member to enable the following trolley to pass said second member prior to actuation of the reset device by said leading trolley.

17. An empty place spotter and control mechanism having means to mount the same adjacent the path of a moving conveyor to signal the presence of a load unit being propelled by a pusher or like member of said conveyor, said load unit comprising forward and rearward trolleys, said mechanism including first and second movable arms having means positioning the same respectively for the respective engagement and shifting of said first arm by the forward trolley of a conveyor-propelled load unit and of said second arm by a conveyor member only, said first arm having means operatively connecting the same with said second arm to control the further positioning of the latter in and out of position for such engagement and operation by said conveyor member, and a reset device operatively connected to said first arm and engaged and actuated by said forward trolley of said load unit in a spacing forwardly to said first arm not less than the longitudinal spacing of the forward and rearward trolleys from one another, said reset device restoring said first arm to the position thereof prior to its shifting.

18. An empty place spotter and control mechanism having means to mount the same adjacent the path of a moving conveyor to signal the presence of a load unit being propelled by a pusher or like member of said conveyor, and a device operated by said mechanism, said load unit comprising forward and rearward trolleys, said mechanism including first and second movable arms having means positioning the same respectively for the respective engagement and shifting of said first arm by the forward trolley of a conveyor-propelled load unit and of said second arm by a conveyor member only, said first arm having means operatively connecting the same with said second arm to control the further positioning of the latter in and out of position for such engagement and operation by said conveyor member, means operatively connected to said second arm and to said operated device and actuated by said second arm in response to said operation of the latter, and a reset device operatively connected to said first arm and engaged and actuated by said forward trolley of said load unit in a spacing forwardly to said first arm not less than the longitudinal spacing of the forward and rearward trolleys from one another, said reset device restoring said first arm to the position thereof prior to its shifting.

19. An empty place spotter and control mechanism having means to mount the same adjacent the path of a moving conveyor to signal the presence of a load unit being propelled by a pusher or like member of said conveyor, said load unit comprising forward and rearward trolleys, said mechanism including first and second movable arms having means positioning the same respectively rearwardly and forwardly in reference to the direction of movement of said conveyor member, and for the respective engagement and shifting of said first arm by the forward trolley of a conveyor-propelled load unit and of said second arm by a conveyor member only, said first arm having means operatively connecting the same with said second arm to control the further positioning of the latter in and out of position for such engagement and operation by said conveyor member, and a reset device operatively connected to said first arm and engaged and actuated by said forward trolley of said load unit in a spacing forwardly to said first arm not less than the longitudinal spacing of the forward and rearward trolleys from one another, said reset device restoring said first arm to the position thereof prior to its shifting.

20. An empty place spotter and control mechanism having means to mount the same adjacent the path of a moving conveyor to signal the presence of a load unit being propelled by a pusher or like member of said conveyor, said load unit comprising forward and rearward trolleys, said mechanism including first and second movable arms having means positioning the same respectively rearwardly and forwardly in reference to the direction of movement of said conveyor member, and for the respective engagement and shifting of said first arm by the forward trolley of a conveyor-propelled load unit and of said second arm by a conveyor member only, said first arm having means operatively connecting the same with said second arm to control the further positioning of the latter in and out of position for such engagement and operation by said conveyor member, said first arm being moved upon engagement by a load unit in a direction approximately normal to the path of movement of the propelled load unit, and a reset device operatively connected to said first arm and engaged and actuated by said forward trolley of said load unit in a spacing forwardly to said first arm not less than the longitudinal spacing of the forward and rearward trolleys from one another, said reset device restoring said first arm to the position thereof prior to its shifting.

21. In a transfer control mechanism for a conveyor system by which a load unit including a trolley and load carrier member supported thereby is propelled by a continuously moving conveyor along one track for transfer to a further track in convergent relation at a transfer zone to said one track, said load carrier member having abutment means thereon in predetermined relation thereto and to a trolley supporting the member, said conveyor having longitudinally spaced members adapted to engage and propel said trolley on said one track to a control device adjacent the latter, the improvement in accordance with which said device has means engaging respectively said trolley and the abutment means of the load carrier member thereof, and acting to accurately control the transfer at said transfer zone of the load unit from said one track to said further track.

22. The improvement in a transfer control system characterized by a load unit including a load carrier member and a mobile member supporting said carrier member for travel therewith, and by means operating to control the travel of said unit in response to signal from a signaling unit; in accordance with which improvement said carrier member of said system is provided with an abutment element located thereon in a predetermined position-wise relationship to the carrier member and to the supporting member of the load unit of the system, said control means being engageable in the control operation with said supporting member and with said abutment element of the load carrier member, said control means having means to operatively connect the same to said signaling unit to produce said control operation.

23. The improvement in a transfer control system characterized by a load unit including a load carrier member and a mobile member supporting said carrier member for travel therewith, and by means operating to control the travel of said unit in response to signal from a signaling unit; in accordance with which improvement said carrier member of said system is provided an abutment element located thereon to project therefrom in a predetermined position-wise relationship to the carrier member, in an upright plane paralleling the direction of travel of the unit, and to the supporting member of the unit of the system, said control means including parts respectively engageable in the control operation with said supporting member and with said abutment element of the load carrier member, said control means having means to operatively connect the same to said signaling unit to produce said control operation.

24. In a conveyor system, the combination of a load unit including a load carrier member and a mobile member supporting said load carrier member for travel therewith, said carrier member having an abutment element located thereon in a predetermined position-wise relationship thereto and to said mobile supporting member of the load unit, and means operating to control the travel of said load unit, said control means having members engageable respectively with said supporting member and with said abutment element of the load carrier member to produce said control operation of said control means.

References Cited in the file of this patent

UNITED STATES PATENTS

| | | |
|---|---|---|
| 1,280,721 | Harding | Oct. 8, 1918 |
| 2,845,034 | Harrison | July 29, 1958 |